US012647240B2

(12) United States Patent
Agarwal et al.

(10) Patent No.: US 12,647,240 B2
(45) Date of Patent: Jun. 2, 2026

(54) SELECTING AN ANTENNA ARRAY FOR BEAM MANAGEMENT

(71) Applicant: QUALCOMM Incorporated, San Diego, CA (US)

(72) Inventors: Rishav Agarwal, Howrah (IN); Arnab Pal, Hyderabad (IN); Vishnu Namboodiri Karakkad Kesavan Namboodiri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 656 days.

(21) Appl. No.: 17/939,846

(22) Filed: Sep. 7, 2022

(65) Prior Publication Data

US 2024/0080172 A1     Mar. 7, 2024

(51) Int. Cl.
| *H04L 5/14* | (2006.01) |
| *H04B 7/06* | (2006.01) |
| *H04W 72/044* | (2023.01) |

(52) U.S. Cl.
CPC ............. *H04L 5/14* (2013.01); *H04B 7/0691* (2013.01); *H04W 72/046* (2013.01)

(58) Field of Classification Search
CPC ...... H04L 5/14; H04L 5/0023; H04W 72/046; H04B 7/0691; H04B 7/0695; H04B 7/088
See application file for complete search history.

(56) References Cited

U.S. PATENT DOCUMENTS

| 10,998,956 B1 * | 5/2021 | Pal | ........................ | H04B 7/0696 |
| 2018/0270799 A1 * | 9/2018 | Noh | ........................ | H04L 27/261 |

| 2020/0412425 | A1 * | 12/2020 | Laghate | ............... | H04B 7/0695 |
| 2021/0136739 | A1 * | 5/2021 | Chen | .................... | H04W 56/001 |
| 2021/0159966 | A1 * | 5/2021 | Xi | .......................... | H04B 7/0695 |
| 2022/0053353 | A1 * | 2/2022 | Lee | ........................ | H04B 7/0408 |
| 2022/0069884 | A1 * | 3/2022 | Zhang | .................. | H04B 7/0408 |
| 2022/0116080 | A1 * | 4/2022 | Zhou | .................... | H04B 7/0695 |
| 2022/0116083 | A1 * | 4/2022 | Zhou | .................... | H04B 7/0632 |
| 2022/0182198 | A1 * | 6/2022 | Geekie | ................. | H04B 7/0626 |
| 2023/0062380 | A1 * | 3/2023 | Abdelghaffar | ........ | H04L 5/0094 |
| 2023/0078339 | A1 * | 3/2023 | Haghighat | ............. | H04B 7/088 |
| | | | | | 370/329 |
| 2023/0163939 | A1 * | 5/2023 | Zeng | ......................... | H04L 5/14 |
| | | | | | 370/329 |
| 2023/0254829 | A1 * | 8/2023 | Xiong | ................... | H04L 1/1861 |
| | | | | | 370/329 |
| 2024/0039655 | A1 * | 2/2024 | Rudolf | .................. | H04L 1/0016 |

(Continued)

*Primary Examiner* — Yemane Mesfin
*Assistant Examiner* — Guoxing Fan
(74) *Attorney, Agent, or Firm* — Holland & Hart LLP

(57)     ABSTRACT

Methods, systems, and devices for wireless communications are described. A user equipment (UE) may determine a first and second antenna array are active for the UE operating in a full duplex operation mode, where uplink signaling at the UE corresponds to the first antenna array and downlink signaling at the UE corresponds to the second antenna array. The first and second antenna array may be associated with one or more operating parameters of the UE. The UE may select one antenna array of the first or second antenna array to use for both the uplink signaling and the downlink signaling based on a value of the one or more operating parameters of the UE satisfying a first threshold value. The UE may communicate, in the full duplex operation mode, the uplink signaling and the downlink signaling using the selected antenna array.

28 Claims, 12 Drawing Sheets

(56) References Cited

U.S. PATENT DOCUMENTS

2024/0129007 A1*  4/2024  Zhu ........................ H04B 7/088
2024/0171252 A1*  5/2024  Bhamri ................. H04L 5/0048
2024/0172199 A1*  5/2024  Jung .................... H04L 5/0092
2024/0259053 A1*  8/2024  Canonne-Velasquez ...................
                                                H04B 7/0626

* cited by examiner

Downlink Beam 205      Uplink Beam 210

Phasor 215-b

Phasor 215-c

Phasor 215-a

Phasor 215-d

UE 115-a 105-a 210-b 205-b 210-a 205-a 210-c 205-c 105-b 115-a

200

Figure 11:
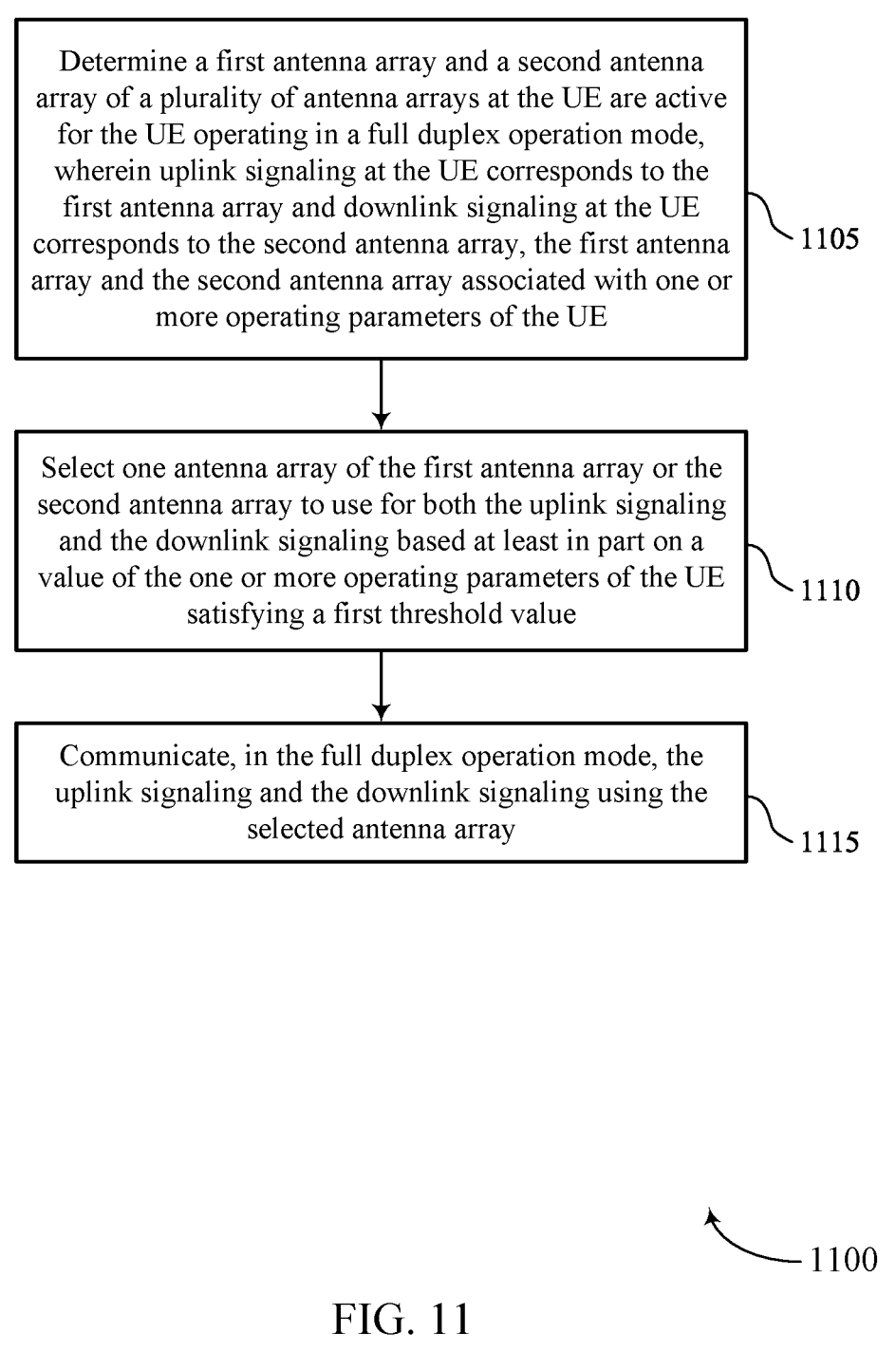

Determine a first antenna array and a second antenna array of a plurality of antenna arrays at the UE are active for the UE operating in a full duplex operation mode, wherein uplink signaling at the UE corresponds to the first antenna array and downlink signaling at the UE corresponds to the second antenna array, the first antenna array and the second antenna array associated with one or more operating parameters of the UE

1105

Select one antenna array of the first antenna array or the second antenna array to use for both the uplink signaling and the downlink signaling based at least in part on a value of the one or more operating parameters of the UE satisfying a first threshold value

1110

Communicate, in the full duplex operation mode, the uplink signaling and the downlink signaling using the selected antenna array

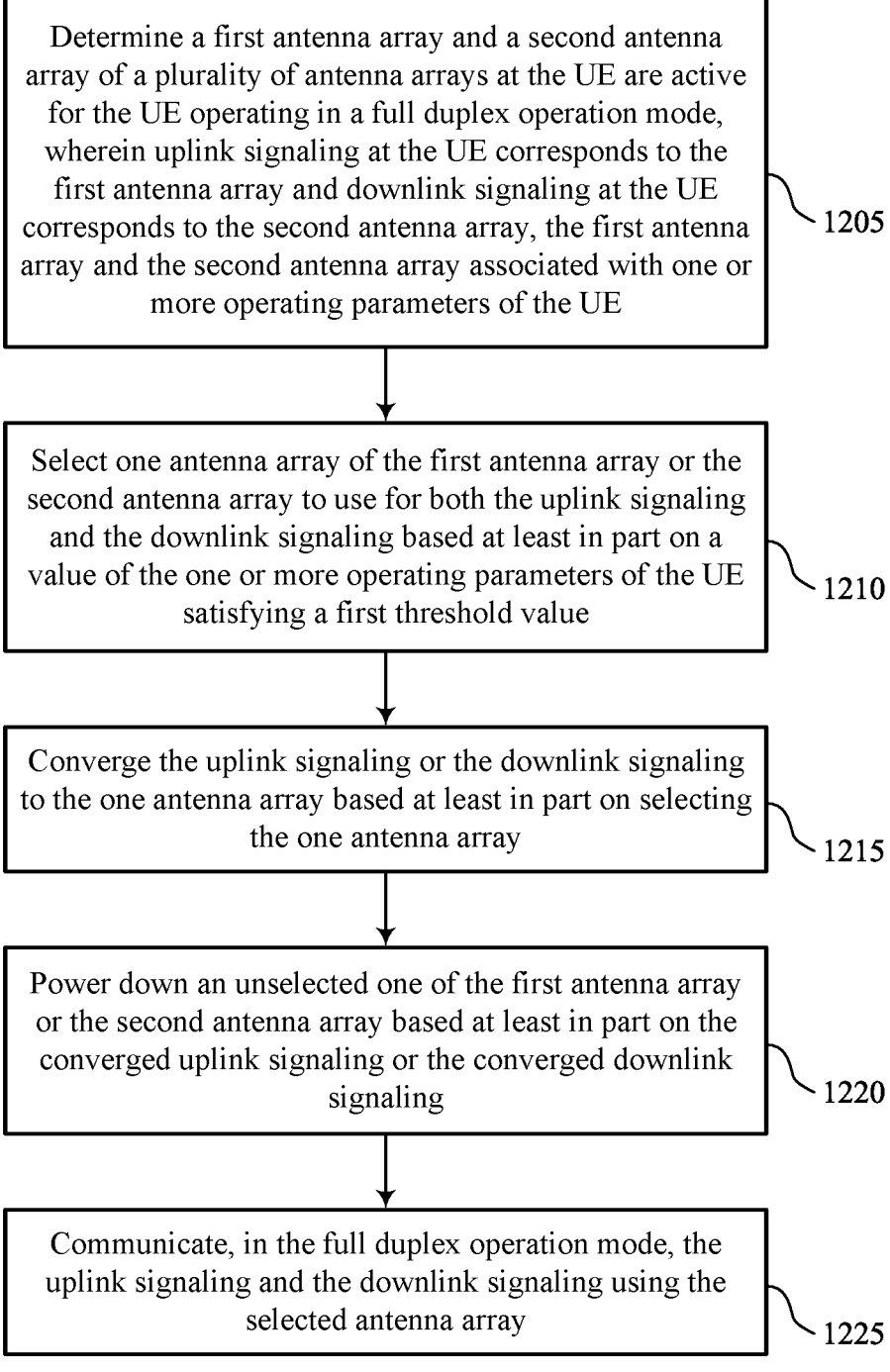

Determine a first antenna array and a second antenna array of a plurality of antenna arrays at the UE are active for the UE operating in a full duplex operation mode, wherein uplink signaling at the UE corresponds to the first antenna array and downlink signaling at the UE corresponds to the second antenna array, the first antenna array and the second antenna array associated with one or more operating parameters of the UE

1205

Select one antenna array of the first antenna array or the second antenna array to use for both the uplink signaling and the downlink signaling based at least in part on a value of the one or more operating parameters of the UE satisfying a first threshold value

1210

Converge the uplink signaling or the downlink signaling to the one antenna array based at least in part on selecting the one antenna array

1215

Power down an unselected one of the first antenna array or the second antenna array based at least in part on the converged uplink signaling or the converged downlink signaling

1220

Communicate, in the full duplex operation mode, the uplink signaling and the downlink signaling using the selected antenna array

SELECTING AN ANTENNA ARRAY FOR BEAM MANAGEMENT

FIELD OF TECHNOLOGY

The following relates to wireless communications, including selecting an antenna array for beam management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications, a UE may communicate uplink signaling and downlink signaling via separate beams.

SUMMARY

The described techniques relate to improved methods, systems, devices, and apparatuses that support selecting an antenna array for beam management. For example, the described techniques may provide for a user equipment (UE) to efficiently select a single antenna array to communicate both uplink and downlink signaling. For example, the UE may determine a first antenna array and a second antenna array of multiple antenna arrays at the UE are active for the UE operating in a full duplex operation mode. In some cases, the first antenna array may correspond to uplink signaling at the UE and the second antenna array may correspond to downlink signaling at the UE. The first antenna array and the second antenna array may be associated with one or more operating parameters at the UE. In such examples, the UE may select one antenna array of the first antenna array or the second antenna array to use for both the uplink signaling and downlink signaling based on a value of one or more operating parameters of the UE satisfying a first threshold value. The UE may communicate, in full duplex operation mode, the uplink signaling and the downlink signaling using the selected antenna array.

A method for wireless communication at a UE is described. The method may include determining a first antenna array and a second antenna array of a set of multiple antenna arrays at the UE are active for the UE operating in a full duplex operation mode, where uplink signaling at the UE corresponds to the first antenna array and downlink signaling at the UE corresponds to the second antenna array, the first antenna array and the second antenna array associated with one or more operating parameters of the UE, selecting one antenna array of the first antenna array or the second antenna array to use for both the uplink signaling and the downlink signaling based on a value of the one or more operating parameters of the UE satisfying a first threshold value, and communicating, in the full duplex operation mode, the uplink signaling and the downlink signaling using the selected antenna array.

An apparatus for wireless communication at a UE is described. The apparatus may include a processor, memory coupled with the processor, and instructions stored in the memory. The instructions may be executable by the processor to cause the apparatus to determine a first antenna array and a second antenna array of a set of multiple antenna arrays at the UE are active for the UE operating in a full duplex operation mode, where uplink signaling at the UE corresponds to the first antenna array and downlink signaling at the UE corresponds to the second antenna array, the first antenna array and the second antenna array associated with one or more operating parameters of the UE, select one antenna array of the first antenna array or the second antenna array to use for both the uplink signaling and the downlink signaling based on a value of the one or more operating parameters of the UE satisfying a first threshold value, and communicate, in the full duplex operation mode, the uplink signaling and the downlink signaling using the selected antenna array.

Another apparatus for wireless communication at a UE is described. The apparatus may include means for determining a first antenna array and a second antenna array of a set of multiple antenna arrays at the UE are active for the UE operating in a full duplex operation mode, where uplink signaling at the UE corresponds to the first antenna array and downlink signaling at the UE corresponds to the second antenna array, the first antenna array and the second antenna array associated with one or more operating parameters of the UE, means for selecting one antenna array of the first antenna array or the second antenna array to use for both the uplink signaling and the downlink signaling based on a value of the one or more operating parameters of the UE satisfying a first threshold value, and means for communicating, in the full duplex operation mode, the uplink signaling and the downlink signaling using the selected antenna array.

A non-transitory computer-readable medium storing code for wireless communication at a UE is described. The code may include instructions executable by a processor to determine a first antenna array and a second antenna array of a set of multiple antenna arrays at the UE are active for the UE operating in a full duplex operation mode, where uplink signaling at the UE corresponds to the first antenna array and downlink signaling at the UE corresponds to the second antenna array, the first antenna array and the second antenna array associated with one or more operating parameters of the UE, select one antenna array of the first antenna array or the second antenna array to use for both the uplink signaling and the downlink signaling based on a value of the one or more operating parameters of the UE satisfying a first threshold value, and communicate, in the full duplex operation mode, the uplink signaling and the downlink signaling using the selected antenna array.

Some examples of the method, apparatuses, and non-transitory computer-readable medium described herein may further include operations, features, means, or instructions for performing, according to a periodicity for one or more reference signals associated with the first antenna array and the second antenna array, a set of multiple measurements of the one or more reference signals corresponding to a first set of multiple beams associated with the first antenna array and a second set of multiple beams associated with the second antenna array and determining, based on comparing the set of multiple measurements, to store a set of multiple indicators at the UE corresponding to a first uplink beam of the first set of multiple beams, a first downlink beam of the first set of multiple beams, a second uplink beam of the second set of multiple beams, a second downlink beam of the second set of multiple beams, or any combination thereof.

In some examples of the method, apparatuses, and non-transitory computer-readable medium described herein, selecting the one antenna array may include operations, features, means, or instructions for determining a first priority of the downlink signaling corresponding to the second antenna array and a second priority of the uplink signaling corresponding to the first antenna array based on one or more traffic parameters of the uplink signaling and the downlink signaling, where the one antenna array may be selected based on the first priority and the second priority, and the one or more traffic parameters include a number of multiple-input-multiple-output layers, a rate of incoming downlink control information, an uplink throughput, a downlink throughput, a downlink modulation and coding scheme, a quadrature amplitude modulation (QAM), a rank indicator, a capacity of uplink buffers, a buffer status report (BSR), or any combination thereof.

In some examples of the method, apparatuses, and non-transitory computer-readable medium described herein, selecting the one antenna array may include operations, features, means, or instructions for determining a first priority of the downlink signaling corresponding to the second antenna array may be greater than a second priority of the uplink signaling corresponding to the first antenna array based on one or more traffic parameters of the uplink signaling and the downlink signaling, selecting the second antenna array as the one antenna array based on a difference between a first subset of measurements of the set of multiple measurements corresponding to the first uplink beam and a second subset of measurements of the set of multiple measurements corresponding to the second uplink beam satisfying a second threshold value, where the set of multiple indicators includes the set of multiple measurements, and communicating the uplink signaling via the second uplink beam and the downlink signaling via the second downlink beam based on selecting the second antenna array.

In some examples of the method, apparatuses, and non-transitory computer-readable medium described herein, the one or more traffic parameters include a number of multiple-input-multiple-output layers, a rate of incoming downlink control information, an uplink throughput, a downlink throughput, a downlink modulation and coding scheme, a QAM, a rank indicator, a capacity of uplink buffers, a BSR, or any combination thereof.

In some examples of the method, apparatuses, and non-transitory computer-readable medium described herein, selecting the one antenna array may include operations, features, means, or instructions for determining a first priority of the downlink signaling corresponding to the second antenna array may be less than a second priority of the uplink signaling corresponding to the first antenna array based on one or more traffic parameters of the uplink signaling and the downlink signaling, selecting the first antenna array based on a difference between a first subset of measurements of the set of multiple measurements corresponding to the first downlink beam and a second subset of measurements of the set of multiple measurements corresponding to the second downlink beam satisfying a second threshold value, where the set of multiple indicators includes the set of multiple measurements, and communicating the uplink signaling via the first uplink beam and the downlink signaling via the first downlink beam based on selecting the first antenna array.

Some examples of the method, apparatuses, and non-transitory computer-readable medium described herein may further include operations, features, means, or instructions for performing the set of multiple measurements may be based on a timer expiring.

In some examples of the method, apparatuses, and non-transitory computer-readable medium described herein, the set of multiple measurements include a reference signal receive power of the one or more reference signals, a signal quality of the one or more reference signals, a signal-to-noise ratio (SNR) of the one or more reference signals, a spectral efficiency of the one or more reference signals, or any combination thereof.

Some examples of the method, apparatuses, and non-transitory computer-readable medium described herein may further include operations, features, means, or instructions for converging the uplink signaling or the downlink signaling to the one antenna array based on selecting the one antenna array and powering down an unselected one of the first antenna array or the second antenna array based on the converged uplink signaling or the converged downlink signaling.

Some examples of the method, apparatuses, and non-transitory computer-readable medium described herein may further include operations, features, means, or instructions for selecting the second antenna array based on determining a first priority of the downlink signaling corresponding to the second antenna array may be greater than a second priority of the uplink signaling corresponding to the first antenna array based on one or more traffic parameters of the uplink signaling and the downlink signaling, converging the uplink signaling from the first antenna array to the second antenna array based on selecting the second antenna array, and powering down the first antenna array based on the converged uplink signaling.

Some examples of the method, apparatuses, and non-transitory computer-readable medium described herein may further include operations, features, means, or instructions for selecting the first antenna array based on determining a first priority of the downlink signaling corresponding to the second antenna array may be less than a second priority of the uplink signaling corresponding to the first antenna array based on one or more traffic parameters of the uplink signaling and the downlink signaling, converging the downlink signaling from the second antenna array to the first antenna array based on selecting the first antenna array, and powering down the second antenna array based on the converged downlink signaling.

In some examples of the method, apparatuses, and non-transitory computer-readable medium described herein, the one or more operating parameters include a power level at the UE, a thermal level at the UE, a remaining battery life of the UE, or any combination thereof.

In some examples of the method, apparatuses, and non-transitory computer-readable medium described herein, the uplink signaling and the downlink signaling include one or more synchronization signals.

BRIEF DESCRIPTION OF THE DRAWINGS

FIGS. 11 and 12 show flowcharts illustrating methods that support selecting an antenna array for beam management in accordance with one or more aspects of the present disclosure.

DETAILED DESCRIPTION

Figure 1:
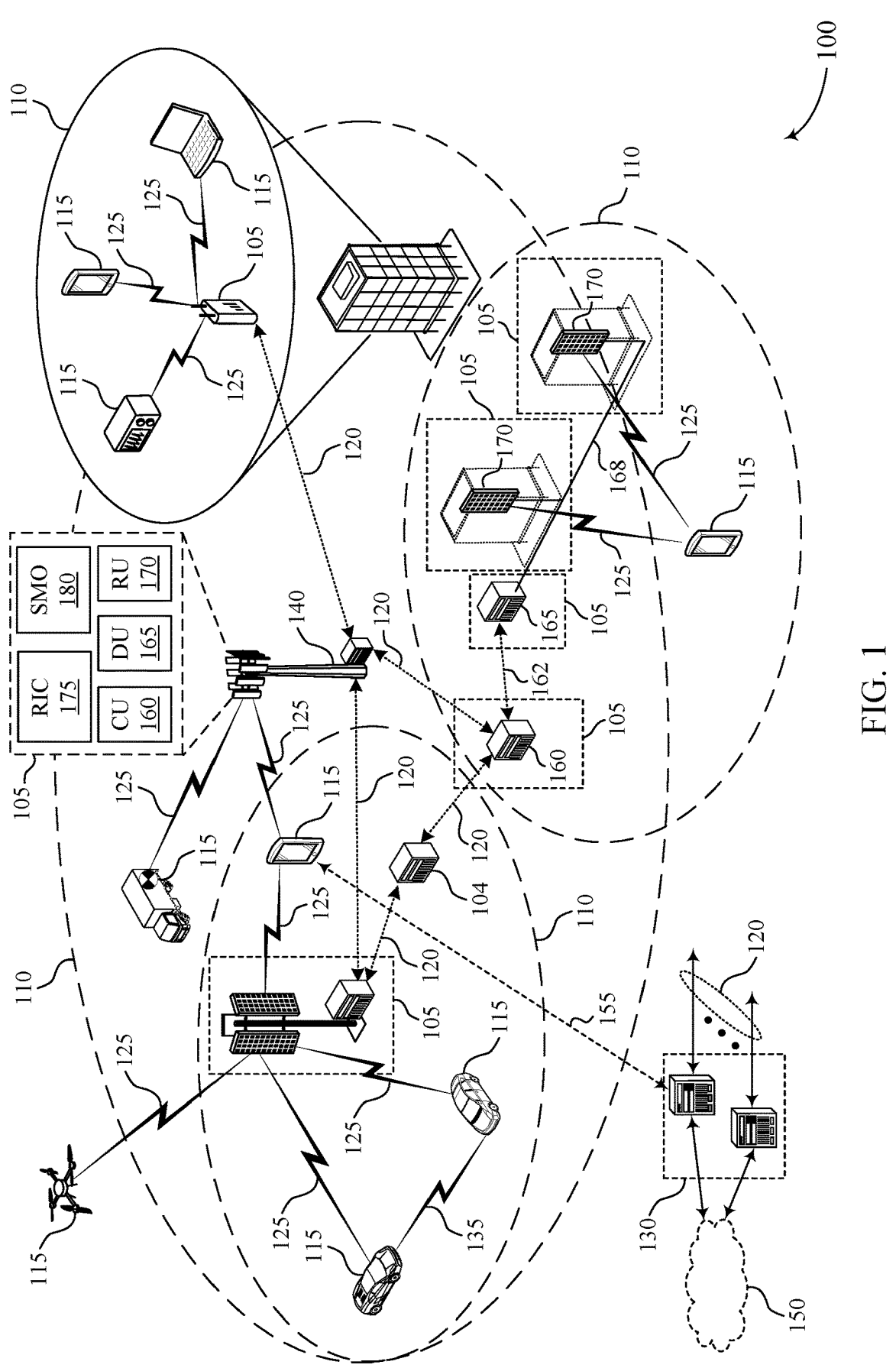
FIGS. 1 through 3 illustrate examples of wireless communications systems that support selecting an antenna array for beam management in accordance with one or more aspects of the present disclosure.

In some wireless communications systems, a user equipment (UE) may select a beam for uplink communications and a different beam for downlink communications with a network entity, such as for exchanging reference signals (e.g., synchronization signal blocks (SSBs)). For example, the UE may maintain one or more uplink metrics (e.g., power saving metrics) for uplink transmission beams and one or more downlink metrics (e.g., spectral efficiency) for downlink receive beams. Based on the respective metrics, the UE may select an uplink transmission beam and a downlink receive beam. Thus, the UE may benefit from maintaining two different beams (e.g., one for uplink and one for downlink) that the UE may select according to the respective metrics.

In some cases, however, the UE may select an uplink transmission beam and a downlink receive beam that correspond to different antenna arrays, which may be referred to as phasors. In such cases, the UE may simultaneously activate both phasors during communications, which may compromise a power cycle at the UE. That is, simultaneously activating multiple phasors at the UE may cause a power consumption at the UE to exceed a threshold, thereby reducing battery life and user experience at the UE. Additionally, or alternatively, simultaneously activating multiple phasors at the UE may cause one or more thermal properties at the UE to exceed a threshold (e.g., related to the increased power consumption). Thus, the UE may perform a thermal mitigation procedure, which may reduce the transmission power causing reception or decoding errors.

The techniques described herein may enable a UE to select a single phasor (e.g., antenna array) to maintain both uplink and downlink signaling, converge uplink signaling and downlink signaling onto a single phasor, or both. For example, the UE may determine that two phasors are active, where the UE transmits uplink signaling using a first phasor and receives downlink signaling using a second phasor. The UE may select one phasor for both the uplink beam and downlink beam based on a value of one or more operating parameters (e.g., a power level at the UE, thermal parameters at the UE, or battery life of the UE) satisfying a threshold value. For example, the UE may detect that a power usage level is above a threshold, the battery life of the UE is below a threshold value, that the UE is operating in a thermal mitigation mode, or any combination thereof and determine to select a single phasor.

In some cases, upon detecting the one or more parameters satisfying a threshold, the UE may determine whether the uplink signaling or the downlink signaling is a priority based on traffic parameters associated with each communication direction. In some cases, the UE may use a look up table (LUT) to select the first phasor, or the second phasor based on comparing beam metrics for uplink beams and downlink beams. That is, if the UE prioritizes the uplink signaling on the first phasor, the UE may use the LUT to evaluate and switch the downlink signaling to a candidate downlink beam of the first phasor. Likewise, if the UE prioritizes the downlink signaling on the second phasor, the UE may use the LUT to evaluate and switch the uplink signaling to a candidate uplink beam of the second phasor.

In some other cases, the UE may converge both the uplink signaling and the downlink signaling on a single phasor based on the determined priority. For example, in cases where the UE prioritizes the uplink signaling, the UE may merge the downlink signaling with the uplink signaling on the first phasor. In some other cases, where the UE determines to prioritize the downlink signaling, the UE may merge the uplink signaling with the downlink signaling on the second phasor. The UE may then communicate the uplink signaling and downlink signaling using the selected phasor. Thus, the UE may efficiently mitigate the effects of two active phasors, thereby increasing battery life, reducing thermal mitigation procedures, and increasing user experience.

Aspects of the disclosure are initially described in the context of wireless communications systems. Aspects of the disclosure are further described in the context of process flows. Aspects of the disclosure are further illustrated by and described with reference to apparatus diagrams, system diagrams, and flowcharts that relate to selecting an antenna array for beam management.

FIG. 1 illustrates an example of a wireless communications system 100 that supports selecting an antenna array for beam management in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125

(e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support selecting an antenna array for beam management as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples of wireless communications system 100 (e.g., new radio (NR)), the UE 115 may select an uplink beam and a downlink beam for communications in a full duplex mode. For example, the UE 115 may be transmitting and receiving in both directions on a single frequency band (e.g., carrier) at the same time. In some cases, the UE 115 may be operating in frequency range two (FR2) (e.g., 24.25 GHz to 52.6 GHz). The uplink beam may define a direction in which the UE 115 transmits signaling, such as uplink reference signals (e.g., an uplink SSB) or data. The downlink beam may define a direction in which the UE 115 receives downlink signaling, such as downlink reference signals (e.g., a downlink SSB) or data. The uplink beams and downlink beams the UE 115 selects may be referred to as serving beams.

Generally, the UE 115 may keep a phasor (e.g., antenna array) powered on for an active serving beam. In some scenarios, the UE 115 may choose one serving beam at a given time, such that one phasor is active during communications with the network entity (e.g., except for search or measurement scheduling on beams of other phasors, which may be periodic). In order to enhance power saving at the UE 115, the UE 115 may choose two beams, with a separate uplink serving beam and a downlink serving beam to save uplink power, maximize downlink signal-to-noise ratio (SNR), and maximize the uplink virtual power head room report (VHPR). In some cases, the UE may maximize a reference signal received power (RSRP) parameter instead of SNR (e.g., as it is proportional to SNR) when selecting the downlink beam.

In some examples, the UE 115 may select an uplink beam and a downlink beam (e.g., beam decoupling) according to a beam selection metric, BSMetric, where the BSMetric may be a function of a quasi-colocation (QCL) type of a reference beam, $QCL_{ref}$, and the UE beam, $UE_b$, according to Equation 1:

$$BSMetric(QCL_{ref}, UE_b) = RSRP_{dBm}(QCL_{ref}, UE_b) + P_{max\_weight} * P_{max\_dBm}(UE_b), \qquad (1)$$

where $RSRP_{dBm}$ is the RSRP for the measured beams in decibels (dB), $P_{max\_weight}$ is a weighting factor that corresponds to the maximum power for the beams, and $P_{max\_dBm}$ is the maximum power for the beams in dB.

The uplink VPHR may depend on pathloss of uplink signaling and $P_{max\_BM}$, where $P_{max\_BM}$ corresponds to the maximum power of a specific beam antenna (e.g., phasor).

However, since the $P_{max\_BM}$ and downlink performance metrics are not correlated, the UE 115 may choose a different $UE_b$ from the uplink and downlink. Additionally, $P_{max\_weight}$ may take different values based on the type of (e.g., the goal of) beam selection such as uplink centric, downlink centric, or balanced between uplink and downlink serving beams. Based on Equation 1, the UE 115 might end up selecting different uplink and downlink beams from different phasors. Thus, the UE 115 may keep two phasors active simultaneously, because beam switching may occur at a symbol-level, where a symbol is a fraction of a dynamic scheduling unit (e.g., slot) in the time domain. The UE 115 may not be able to activate and deactivate the phasors (e.g., bring up and down the phasor) at that rate, thus may keep both phasor active.

In such cases, the UE 115 may simultaneously activate both phasors during communications, which may compromise a power cycle at the UE 115. That is, simultaneously activating multiple phasors at the UE 115 may cause a power consumption at the UE 115 to exceed a threshold, thereby reducing battery life and user experience at the UE 115. Additionally, or alternatively, simultaneously activating multiple phasors at the UE 115 may cause one or more thermal properties at the UE 115 to exceed a threshold (e.g., related to the increased power consumption). Thus, the UE 115 may perform a thermal mitigation procedure, which may reduce the transmission power causing reception or decoding errors.

In some implementations, the UE 115 may select a single phasor to maintain both uplink and downlink signaling, converge uplink signaling and downlink signaling onto a single phasor, or both. For example, the UE 115 may determine that two phasors are active, where the UE 115 transmits uplink signaling using a first phasor and receives downlink signaling using a second phasor. The UE 115 may select one phasor for both the uplink beam and downlink beam based on a value of one or more operating parameters (e.g., a power level at the UE 115, thermal parameters at the UE 115, or battery life of the UE 115) satisfying a threshold value. For example, the UE 115 may detect that a power usage level is above a threshold, the battery life of the UE 115 is below a threshold value, that the UE 115 is operating in a thermal mitigation mode, or any combination thereof and determine to select a single phasor. The UE 115 may then communicate the uplink signaling and downlink signaling using the selected phasor. Thus, the UE 115 may efficiently mitigate the effects of two active phasors, thereby increasing battery life, reducing thermal mitigation procedures, and increasing user experience.

Figure 2:

FIG. 2 illustrates an example of a wireless communications system 200 that supports selecting an antenna array for beam management in accordance with one or more aspects of the present disclosure. The wireless communications system 200 may implement or be implemented by aspects of wireless communications system 100 with reference to FIG. 1. For example, the wireless communications system 200 may include a network entity 105-a and a network entity 105-b, which may be examples of network entities 105 described herein with reference to FIG. 1. Likewise, the wireless communications system 200 may include a UE 115-a, which may be an example of a UE 115 described herein with reference to FIG. 1.

In some examples of the wireless communications system 200, the UE 115-a may perform a beamforming procedure. As a part of the beamforming procedure, the UE 115-a may be configured (e.g., programmed) to select an uplink beam 210 and a downlink beam 205 for receiving or transmitting the respective synchronization signal blocks (SSBs) (e.g., downlink beam 205-b and uplink beam 210-b) of the respective channels (e.g., in full duplex mode). In some cases, however, the UE 115-a may select a downlink beam 205 that does not meet one or more downlink metrics, such as power saving metrics. Additionally, or alternatively, the UE 115-a may select an uplink beam 210 that does not meet one or more uplink metrics, such as spectral efficiency metrics. The spectral efficiency metrics may define a threshold quantity of data bits that may be transmitted from the UE 115-a to the network entity 105-a while maintaining the quality of service of the uplink signaling. Thus, the UE 115-a may benefit by maintaining two separate beams, where the downlink beam 205 may meet the spectral efficiency metrics and the uplink beam 210 may meet the power saving metrics.

In some scenarios, the UE 115-a may select a downlink beam 205 and an uplink beam 210 from different phasors based on meeting the one or more power saving metrics and spectral efficiency metrics. For example, the UE 115-a may select a downlink beam 205-a on a phasor 215-a that meets the spectral efficiency metrics, and select an uplink beam 210-a on a phasor 215-b that meets the power saving metrics. The UE 115-a may be operating in a full-duplex mode, in which the UE 115-a may simultaneously transmit uplink signaling and receive downlink signaling. Thus, in some cases, the UE 115-a may simultaneously activate the phasor 215-a and the phasor 215-b during communications with the network entity 105-a. For example, the UE 115-a may simultaneously activate the phasor 215-a and the phasor 215-b due to a high frequency of beam switching between the downlink beam 205-a and uplink beam 210-a in scenarios when time division duplexing (TDD) in FR2, TDD slots, or frequency division duplexing (FDD) in FR2 are deployed. In other words, deactivating and activating the phasors 215 during a beam switching procedure, may lead to an increase in power consumption (e.g., more power wastage), as compared to scenario where both the downlink beam 205-a and the uplink beam 210-a correspond to same phasor 215. Thus, to reduce the effects of beam switching, the UE may simultaneously activate the phasor 215-a and the phasor 215-b for communications with the network entity 105-a.

However, simultaneously activating both the phasor 215-a and the phasor 215-b may lead to further power consumption and overheating at the UE 115-a. For example, power consumption at the UE 115-a may be a function of the quantity of active phasors 215. Thus, if the UE 115-a retains both the phasor 215-a for the downlink beam 205-a and the phasor 215-b for the uplink beam 210-a, the UE 115-a may consume more power leading to decreased battery life and degraded user experience. Additionally, the UE 115-a may experience overheating due two active phasors 215, which may lead to the UE 115-a performing a thermal mitigation procedure. Such thermal mitigation procedures may reduce the transmission power of the UE 115-a causing reception or decoding errors. Moreover, the UE 115-a may communicate with the network entity 105-b via a downlink beam 205-c on phasor 215-d and an uplink beam 210-c on phasor 215-c, thereby increasing the quantity of active phasors 215, which may further increase power consumption and overheating at the UE 115-a.

In some implementations of the wireless communications system 200, the UE 115-a may select a single phasor 215 to maintain both the uplink beam 210-a and the downlink beam 205-a, converge the uplink beam 210-a and the downlink beam 205-a onto a single phasor 215, or both. For example, the UE 115-a may determine that two phasors 215 are active, where the UE 115-*a* transmits uplink signaling using the uplink beam 210-*a* on the phasor 215-*b* and receives downlink signaling using the downlink beam 205-*a* on the phasor 215-*a*. The UE may select one phasor 215 for both the uplink beam 210-*a* and the downlink beam 205-*a* based on a value of one or more operating parameters (e.g., a power level at the UE 115-*a*, thermal parameters at the UE 115-*a*, or battery life of the UE 115-*a*) satisfying a threshold value. For example, the UE 115-*a* may detect that a power usage level is above a threshold, the battery life of the UE 115-*a* is below a threshold value, that the UE 115-*a* is performing a thermal mitigation procedure, or any combination thereof and determine to select a single phasor 215.

Figure 3:
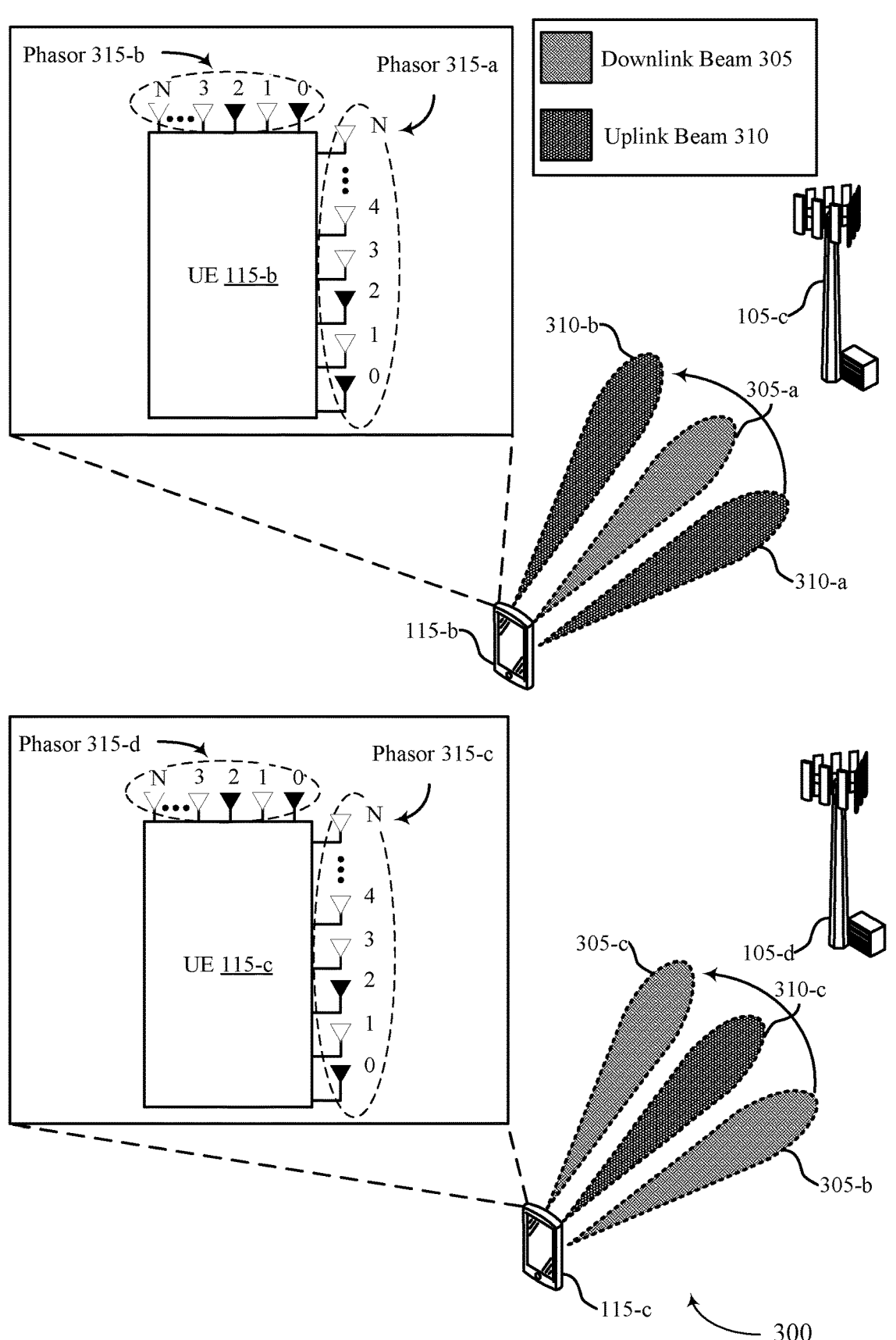

For example, the UE 115-*a* may select a single phasor 215 to maintain an uplink beam 210 and a downlink beam 205 according to a LUT using techniques further described in FIG. 3. Additionally, the UE 115-*a* may select the single phasor 215 and corresponding uplink beam 210 and downlink beam 205 according to a beam selection procedure further described in FIG. 4. In some other examples, the UE 115-*a* may select a single phasor 215 to converge an uplink beam 210 and a downlink beam 205 using techniques further described in FIG. 5. The UE 115-*a* may then communicate the uplink signaling and downlink signaling using the selected phasor 215. Thus, the UE 115-*a* may efficiently mitigate the effects of two active phasors 215, thereby increasing battery life, reducing thermal mitigation procedures, and increasing user experience.

FIG. 3 illustrates an example of a wireless communications system 300 that supports selecting an antenna array for beam management in accordance with one or more aspects of the present disclosure. The wireless communications system 300 may implement or be implemented by aspects of the wireless communications system 100 and the wireless communications system 200 with reference to FIGS. 1 and 2. For example, the wireless communications system 300 may include a network entity 105-*c* and a network entity 105-*d*, which may be examples of network entities 105 described herein with reference to FIGS. 1 and 2. Likewise, the wireless communications system 300 may include a UE 115-*b* and a UE 115-*c* which may be examples of UEs 115 described herein with reference to FIGS. 1 and 2.

In some implementations of the wireless communications system 300, the UE 115-*b* and the UE 115-*c* may select a single phasor 315 to maintain both a downlink beam 305 and an uplink beam 310. To do so, the UEs 115 may maintain a LUT, which may record, or store, a downlink beam 305 that meets one or more downlink metrics and an uplink beam 310 that meets one or more uplink metrics for each phasor 315. For example, the UE 115-*b*, the UE 115-*c*, or both may store values for a downlink beam 305, an uplink beam 310, or both based on comparing one or more signal metrics (e.g., an RSRP, a signal quality, an SNR, or the like) for multiple downlink beams 305 and uplink beams 310 supported by the UE 115-*b*, the UE 115-*c*, or both and selecting the downlink beam 305, the uplink beam 310, or both with highest signal metrics. In some cases, the UE 115-*b*, the UE 115-*c*, or both may generate the LUT (as shown below in Table 1) when the UE 115-*b*, the UE 115-*c*, or both selects a downlink beam 305 and an uplink beam 310. The UE 115-*b*, the UE 115-*c*, or both may regenerate the LUT periodically, such as when a wireless device (e.g., the network entity 105-*c*, the network entity 105-*d*, the UE 115-*b*, the UE 115-*c*, or any combination thereof) updates an SSB. The UEs 115 may measure one or more downlink beams 305 and uplink beams 310 and may populate the LUT with one or more indicators of selected beams (e.g., beams with highest uplink and downlink metrics). To measure the downlink beams 305 and the uplink beams 310, the UEs 115 may measure a RSRP of one or more corresponding SSBs (e.g., reference signals), a signal quality of the SSBs, or an SNR of the SSBs. In some examples, the LUT may include a phasor ID indicating the phasor 315 a UE 115 is using, an uplink beam indicator, X, a downlink beam indicator, Y, a measurement time for both uplink and downlink, or the like for each phasor 315, which is shown in Table 1.

TABLE 1

| Beam LUT | | | | |
|---|---|---|---|---|
| Phasor ID | Uplink Beam | Downlink Beam | $T_{measurement}$ Uplink | $T_{measurement}$ Downlink |
| 1 | $X_1$ | $Y_1$ | $T_a$ | $T_b$ |
| 2 | $X_2$ | $Y_2$ | $T_c$ | $T_d$ |
| 3 | $X_3$ | $Y_3$ | $T_e$ | $T_f$ |
| n | $X_n$ | $Y_n$ | $T_m$ | $T_n$ |

That is, the one or more indicators may include $T_{measurement}$ Uplink and the $T_{measurement}$ Downlink fields that represent a time when the uplink beam 310 and the downlink beam 305 of a phasor 315 were measured on a corresponding serving SSB. For example, if the UE 115-*b* record Table 1, the UE 115-*b* may measure the uplink beam 310-*a* (e.g., $X_1$) for a phasor with phasor ID 1 (e.g., phasor 315-*a*) at a time $T_a$. Likewise, the UE 115-*b* may measure the downlink beam 305-*a* (e.g., $Y_1$) for a phasor with phasor ID 1 at a time $T_b$. Additionally, or alternatively, the UE 115-*b* may measure a different downlink beam 305 (e.g., $X_2$) for a phasor with phasor ID 2 (e.g., phasor 315-*b*), a different uplink beam 310 (e.g., $Y_2$) for the phasor with phasor ID 2, or both at a different time $T_c$, $T_d$, or both.

In addition to the LUT, the UEs 115 may maintain a time-to-live (TTL) parameter (e.g., indicator), which signifies a time period in which the measured uplink beams 310 (e.g., $X_1$, $X_2$, $X_3$, ..., $X_n$) and the measured downlink beams 305 (e.g., $Y_1$, $Y_2$, $Y_3$, ..., $Y_n$) on phasors 315 (e.g., a phasor with a phasor ID 1, 2, 3, ..., n) maintain valid (e.g., good) values. For example, if the TTL parameter is set to 20 milliseconds (ms), the measured uplink beam metric $X_1$ may become invalid (e.g., stale) after an associated timer has expired (e.g., $T_a$+20 ms). Similarly, the measured downlink beam metric $Y_1$ may become invalid after an associated timer has expired (e.g., $T_b$+20 ms). As a result, the UEs 115 may remeasure the uplink beams 310 and downlink beams 305 on corresponding phasors 315 according to a specific periodicity.

Thus, if the UEs 115 (e.g., UE 115-*b*, UE 115-*c*, or both) select an uplink beam 310 and a downlink beam 305 on different phasors 315, the UEs 115 may use the LUT to evaluate the measured uplink beams 310 and downlink beams 305 of both phasors 315. The UEs 115 may compare the measured uplink beams 310 and downlink beams 305 with the selected uplink beam 310 and downlink beam 305. For example, the UEs 115 may use valid measurements within the LUT to evaluate which beams to use for transmission or reception. However, if the measurements are invalid (e.g., a TTL has expired), the UEs 115 may schedule new measurements on beams for both phasors 315, and the UEs 115 may use the new measurements in evaluating the corresponding beams. The UEs 115 may select the phasor 315 to maintain both the uplink beam 310 and the downlink beam 305 based on comparing the measured beams from the LUT with the selected beams. For example, the UEs 115 may select a phasor 315 with highest signal metrics for the uplink beam 310, the downlink beam 305, or both, where the signal metrics for each beam may be stored in the LUT.

In some implementations, the UEs 115 may use the generated LUT to select a single phasor 315 to maintain an uplink beam 310 and a downlink beam 305 based on one or more traffic parameters. For example, the UEs 115 may determine a priority of the downlink beam 305 based on downlink traffic parameters, and determine a priority of the uplink beam 310 based on uplink traffic parameters. That is, in some cases, if the data received at the UEs 115 has a greater priority than (e.g., based on a type of data, a throughput condition of data, or the like) the data transmitted at the UEs 115, the UEs 115 may prioritize the downlink beam 305 over the uplink beam 310. In some other cases, if the data transmitted has a greater priority than the data received at the UEs 115, the UEs 115 may prioritize the uplink beam 310 over the downlink beam 305. Thus, the UEs 115 select the phasor 315 that corresponds to the prioritized beam (e.g., downlink beam 305) to maintain the prioritized beam, and may use the generated LUT to select a beam for the lower priority channel on the selected phasor 315.

In the example of downlink prioritization, the UE 115-*b* may detect that the downlink beam 305-*a* corresponds to (e.g., supports signaling received with) the phasor 315-*b*, while the uplink beam 310-*a* corresponds to (e.g., supports signaling transmitted with) the phasor 315-*a*. Additionally, the UE 115-*b* may detect that one or more operating parameters (e.g., a power level at the UE 115-*b*, thermal parameters at the UE 115-*b*, or battery life of the UE 115-*b*) have satisfied a threshold. For example, the power level may be below a power threshold at the UE 115-*b*, the thermal properties of the UE 115-*b* (e.g., temperature) may exceed a temperature threshold at the UE 115-*b*, the battery life of the UE 115-*b* may be below a battery percentage threshold, or the like, where a network entity 105 may configure the thresholds, or the threshold may be otherwise defined at the UE 115-*b*. In such cases, the UE 115-*b* may determine that the downlink beam 305-*a* priority is greater than the uplink beam 310-*a* priority based on one or more traffic parameters. The UE 115-*b* may use the generated LUT to evaluate the uplink beam 310-*b* in comparison with the uplink beam 310-*a*. If the difference between the uplink metrics for the uplink beam 310-*b* and the uplink metrics for the uplink beam 310-*a* is within an uplink beam metric threshold (e.g., a difference in signal metrics for signaling on the uplink beam 310-*a* versus the uplink beam 310-*b* is above a value), the UE 115-*b* may select phasor 315-*b* for both switching to the uplink beam 310-*b* and maintaining the downlink beam 305-*a*. Additionally, or alternatively, if the uplink beam metrics for the uplink beam 310-*b* are within the uplink beam metric threshold (e.g., signal metrics of signaling on the uplink beam 310-*b* are above a value), the UE 115-*b* may select the phasor 315-*b* to maintain the uplink beam 310-*b* and the downlink beam 305-*a*. That is, the UE 115-*b* may switch the uplink beam 310-*a* from phasor 315-*a* to phasor 315-*b*, while maintaining downlink beam 305-*a*. By doing so, the phasor 315-*a* may be deactivated, thereby saving power by reducing power consumption at the UE 115-*b*.

In some other examples, if the difference between the uplink metrics for the uplink beam 310-*b* and the uplink metrics for the uplink beam 310-*a* is outside of an uplink beam metric threshold (e.g., a difference in signal metrics for signaling on the uplink beam 310-*a* versus the uplink beam 310-*b* is below a value), the UE 115-*b* may select phasor 315-*a* for maintaining the uplink beam 310-*a* and phasor

315-*b* for maintaining the downlink beam 305-*a*. The UE 115-*b* may not switch (e.g., may refrain from switching) to the uplink beam 310-*b*. Additionally, or alternatively, if the uplink beam metrics for the uplink beam 310-*a* are outside of the uplink beam metric threshold (e.g., signal metrics of signaling on the uplink beam 310-*a* are below a value), the UE 115-*b* may use the phasor 315-*a* to maintain the uplink beam 310-*a* and the phasor 315-*b* to maintain the downlink beam 305-*a*. That is, the UE 115-*b* may not switch the uplink beam 310-*a* from phasor 315-*a* to phasor 315-*b*, and instead may maintain the uplink beam 310-*a* at phasor 315-*a* and the downlink beam 305-*a* at phasor 315-*b*.

In the example of uplink prioritization, the UE 115-*c* may detect that the downlink beam 305-*b* corresponds to (e.g., supports signaling received with) the phasor 315-*c*, while the uplink beam 310-*c* corresponds to (e.g., supports signaling received with) the phasor 315-*d*. Additionally, the UE 115-*c* may detect that a value one or more operating parameters (e.g., a power level at the UE 115-*c*, thermal parameters at the UE 115-*c*, or battery life of the UE 115-*c*) have satisfied a threshold. In such cases, the UE 115-*c* may determine that the uplink beam 310-*c* priority is greater than the downlink beam 305-*b* priority based on one or more traffic parameters. The UE 115-*c* may use the generated LUT to evaluate the downlink beam 305-*b* in comparison with the downlink beam 305-*c*. If the difference between the downlink metrics (e.g., spectral efficiency metrics or RSRP) for the downlink beam 305-*c* and the downlink metrics associated with the downlink beam 305-*b* is within a downlink beam metric threshold (e.g., 10 dB), the UE 115-*c* may select phasor 315-*d* for both switching to the downlink beam 305-*c* and maintaining the uplink beam 310-*c*. Additionally, or alternatively, if the downlink beam metrics for the downlink beam 305-*c* are within the uplink beam metric threshold (e.g., signal metrics of signaling on the downlink beam 305-*c* are above a value), the UE 115-*c* may select the phasor 315-*d* to maintain the downlink beam 305-*c* and the uplink beam 310-*c*. That is, the UE 115-*c* may switch the downlink beam 305-*b* from phasor 315-*c* to phasor 315-*d*, while maintaining uplink beam 310-*c*. By doing so, the phasor 315-*c* may be deactivated, thereby saving power by reducing power consumption at the UE 115-*c*.

In some other examples, if the difference between the downlink metrics for the downlink beam 305-*c* and the downlink metrics for the downlink beam 305-*b* is outside of a downlink beam metric threshold (e.g., a difference in signal metrics for signaling on the downlink beam 305-*b* versus the downlink beam 305-*c* is below a value), the UE 115-*c* may select phasor 315-*c* for maintaining the downlink beam 305-*b* and phasor 315-*d* for maintaining the downlink beam 305-*c*. The UE 115-*c* may not switch (e.g., may refrain from switching) to the downlink beam 305-*c*. Additionally, or alternatively, if the downlink beam metrics for the downlink beam 305-*b* are outside of the downlink beam metric threshold (e.g., signal metrics of signaling on the downlink beam 305-*b* are below a value), the UE 115-*c* may use the phasor 315-*c* to maintain the downlink beam 305-*b* and the phasor 315-*b* to maintain the uplink beam 310-*c*. That is, the UE 115-*c* may not switch the downlink beam 305-*b* from phasor 315-*c* to phasor 315-*d*, and instead may maintain the downlink beam 305-*b* at phasor 315-*c* and the uplink beam 310-*c* at phasor 315-*d*.

Figure 4:
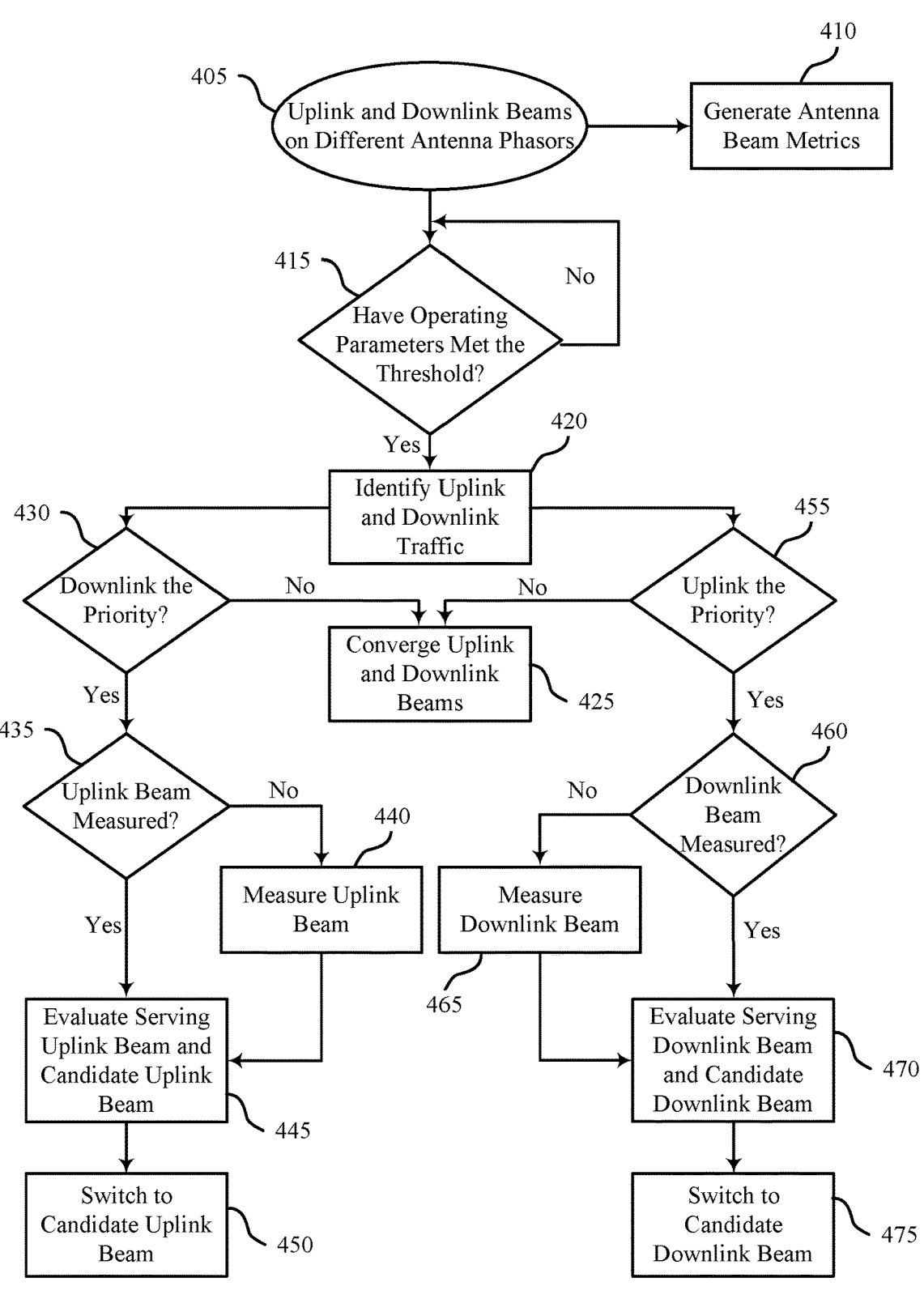
FIG. 4 illustrates an example of a process flow that supports selecting an antenna array for beam management in accordance with one or more aspects of the present disclosure.

FIG. 4 illustrates an example of a process flow 400 that supports selecting an antenna array for beam management in accordance with one or more aspects of the present disclosure. The process flow 400 may be implement, or be implemented, by aspects of the wireless communications system 100, the wireless communications system 200, and the wireless communications system 300 with reference to FIGS. 1 through 3. For example, the process flow 400 may be implemented by a UE 115, which may be an example of UEs 115 described herein with reference to FIGS. 1 through 3. In the following description of the process flow 400, the operations may be performed in a different order than the order shown. Specific operations also may be left out of the process flow 400, or other operations may be added to the process flow 400. Further, although some operations or signaling may be shown to occur at different times for discussion purposes, these operations may actually occur at the same time.

A UE 115 may perform the operations of process flow 400 to mitigate the effects of maintaining two phasors active during full duplex communications with a network entity 105 by selecting a single phasor to maintain two serving beams (e.g., an uplink beam and a downlink beam). For example, the UE 115 may perform the operations of the process flow 400 when detecting that two serving beams support signaling on different phasors and when a value of one or more operating parameters of the UE 115 have reached a threshold value (e.g., a threshold value configured by the network entity 105, or otherwise defined threshold value).

At 405, the UE 115 may detect that two phasors are active, where an a first phasor of the UE 115 supports an uplink beam and a second phasor of the UE 115 supports a downlink beam. At 410, the UE 115 may measure one or more uplink beams and downlink beams of multiple phasors of the UE 115. The UE 115 may generate a LUT that stores one or more indicators of an uplink beam that meets one or more uplink metrics, one or more indicators of a downlink beam that meets one or more downlink metrics, and corresponding times of beam measurements based on performing the measurements, as described with reference to FIG. 3. Additionally, or alternatively, at 410, the UE 115 may generate antenna (e.g., phasor) beam metrics, such as by regenerating the LUT, as each SSB corresponding to (e.g., transmitted or received using) the uplink beam and downlink beam are updated. The generated LUT may be an example of Table 1 described herein with reference to FIG. 3.

At 415, the UE 115 may determine if a value of one or more operating parameters have satisfied a threshold. For example, the UE 115 may determine a power usage or power level at the UE 115 satisfies (e.g., exceeds or is below) a threshold, a thermal property (e.g., internal temperature) of the UE 115 satisfies a threshold, a battery level at the UE 115 satisfies a threshold, or the like. In some cases, the UE 115 may detect that a value of the one or more operating parameters fails to satisfy the threshold. In such cases, the UE may maintain the two active phasors and continue to monitor the operating parameters at 415. In some other cases, the UE 115 may detect that the operating parameters have satisfied the threshold. For example, the UE 115 may determine that a battery level of the UE 115 has surpassed a battery level threshold, that one or more thermal parameters have exceeded a thermal threshold, or that a power level of the UE 115 has exceeded a power threshold. In such cases, the UE 115 may proceed to identifying the uplink and downlink traffic at 420.

At 420, the UE 115 may identify a priority of the uplink beam and a priority of the downlink beam based on one or more traffic parameters. For example, to identify the priority of the uplink beam, the UE 115 may monitor uplink throughput, a capacity of uplink buffers (e.g., L2 uplink buffers), a buffer status report (BSR), or any combination thereof. In some cases, to identify a priority of the downlink beam, the UE 115 may monitor a quantity of MIMO layers, a rate of incoming DCI, a downlink throughput, a quadrature amplitude modulation (QAM), a rank indicator, or any combination thereof.

In some cases, the UE 115 may identify that the priority that the downlink beam and the priority of the uplink beam are equal, identify that neither are the priority, or both, and proceed to converging the uplink and downlink beams at 425. For example, at 425, the UE may use the LUT to converge the uplink beam and downlink beam to a single beam (e.g., beam used for both uplink and downlink) on a single phasor that meets both the respective uplink and downlink metrics.

In some other cases, at 430, the UE 115 may determine that the priority of the downlink beam is greater than the priority of the uplink beam (e.g., the traffic is greater at the downlink beam than the uplink beam). In such cases, the UE 115 may proceed to determining whether an uplink beam is measured at 435. For example, at 435, the UE 115 may determine if an uplink beam is measured on the second phasor (e.g., the phasor that supports the downlink beam). For example, the UE 115 may determine if the measured uplink beam metrics in the LUT are valid metrics (e.g., that a TTL has not expired). If the UE 115 has not measured an uplink beam, or the existing uplink beam metrics in the LUT table are not valid (e.g., the TTL has expired), the UE 115 may proceed to measuring an uplink beam at 440. For example, at 440, the UE 115 may measure one or more uplink beams on the second phasor to determine the uplink beam that meets the uplink metrics and proceed to evaluating serving uplink beams and candidate uplink beams at 445. Alternatively, if the UE 115 has measured an uplink beam on the second phasor and the measurements are valid (e.g., TTL has not expired), the UE 115 may proceed to evaluating serving uplink beams and candidate uplink beams at 445.

At 445, the UE 115 may evaluate the serving uplink beam (e.g., the beam on the first phasor) and the measured (e.g., candidate) uplink beam. For example, the UE 115 may compare one or more uplink metrics of the serving uplink beam and the measured uplink beam. In such examples, the UE 115 may determine whether the difference between the uplink metrics of the serving uplink beam and the measured uplink beam are within an uplink metric threshold, the uplink metrics of the measured uplink beam are within an uplink metric threshold, or both, as described with reference to FIG. 3. In some cases, the UE 115 may determine that the difference in uplink metrics, the uplink metrics of the measured beam, or both are within the uplink metric threshold and may proceed to switching to a candidate uplink beam at 450.

At 450, the UE 115 may switch from using the uplink serving beam on the first phasor to using the measured uplink beam on the second phasor, while maintaining the downlink beam on the second phasor. In such cases, the UE 115 may deactivate the first phasor to reduce power consumption at the UE 115. In some other cases, the UE 115 may determine that the difference in uplink metrics is not within the uplink metric threshold and proceed to converging uplink and downlink beams at 425. For example, at 425, the UE 115 may converge the uplink beams and the downlink beams into a single beam on the first phasor or second phasor.

In some other cases, at 455, the UE 115 may determine that the priority of the uplink beam is greater than the priority of the downlink beam (e.g., the traffic is greater on the uplink beam than the downlink beam). In such cases, the UE 115 may proceed to determining whether a downlink beam is measured at 460. For example, at 460, the UE 115 may use the LUT to determine whether a downlink beam is measured on the first phasor (e.g., the phasor corresponding to the prioritized uplink beam), or whether the measured downlink beam on the first phasor is valid (e.g., TTL has not expired). In some cases, the UE 115 may determine that the downlink beam is not measured and proceed to measuring a downlink beam at 465. For example, at 465, the UE 115 may measure one or more downlink beams on the first phasor and determine which downlink beam meets the downlink beam metrics, as described with reference to FIG. 3. The UE 115 may then proceed to evaluating a serving downlink beam and a candidate downlink beam at 470. In some other cases, the UE 115 may determine that the measurements in the LUT for the downlink beam are valid and proceed to evaluating a serving downlink beam and a candidate downlink beam at 470.

At 470, the UE 115 may evaluate the serving downlink beam (e.g., the beam on the second phasor) and the measured (e.g., candidate) downlink beam. For example, the UE 115 may compare one or more downlink metrics of the serving downlink beam and the measured downlink beam. In such examples, the UE 115 may determine whether the difference between the downlink metrics of the serving downlink beam and the measured downlink beam are within a downlink metric threshold, the measured downlink beam metrics are within the downlink metric threshold, or both. In some cases, the UE 115 may determine that the difference in downlink metrics, the measured downlink beam metrics, or both, are within the downlink metric threshold and proceed to switching to a candidate downlink beam at 475.

At 475, the UE 115 may switch from using the downlink serving beam on the second phasor to using the measured downlink beam on the first phasor, while maintaining the uplink beam on the first phasor. In such cases, the UE 115 may deactivate the second phasor to reduce power consumption at the UE 115. In some other cases, the UE 115 may determine that the difference in downlink metrics is not within the downlink metric threshold and proceed to converge the uplink beams and the downlink beams into a single beam on the first phasor or second phasor at 425.

Figure 5:
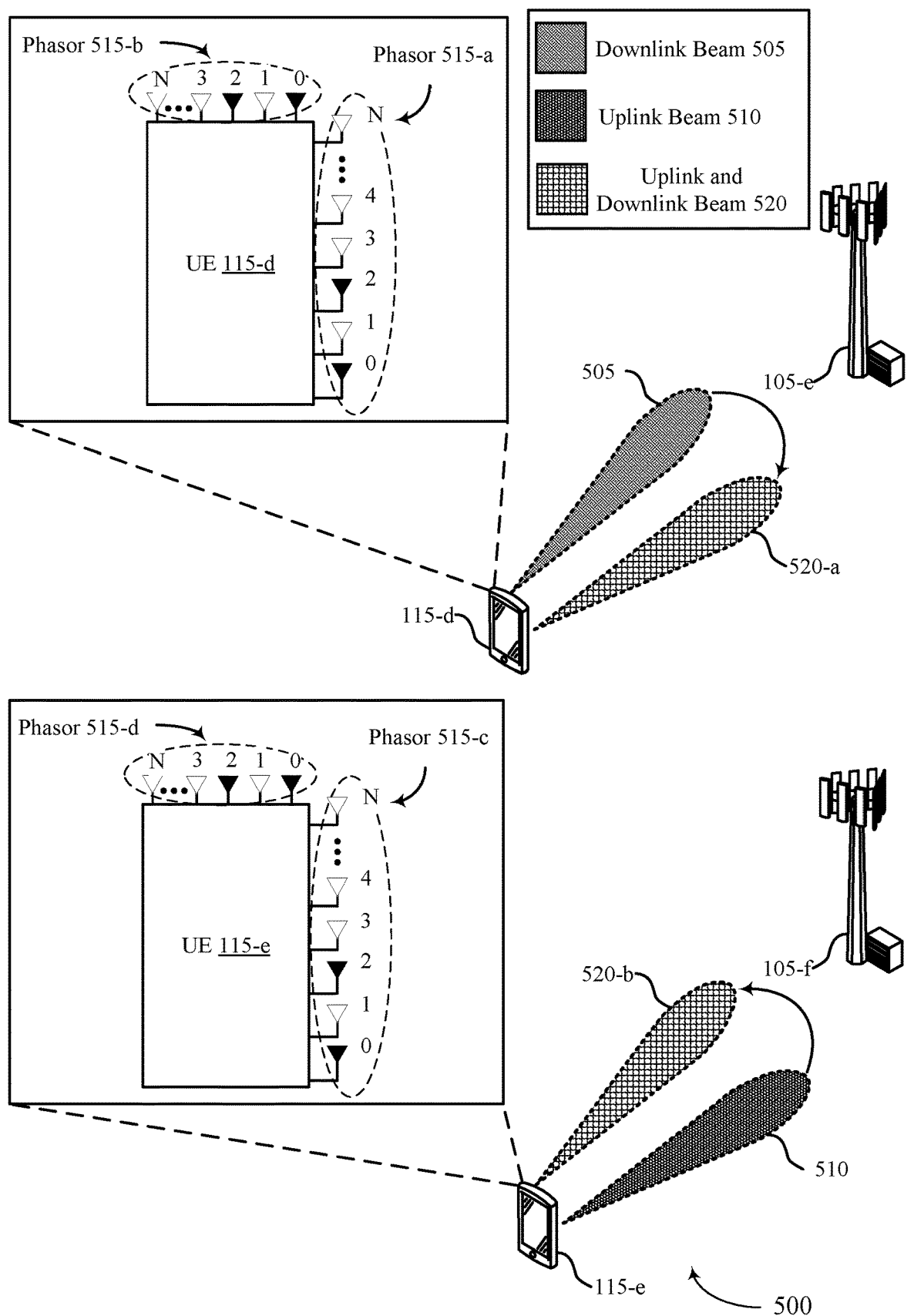
FIG. 5 illustrates an example of a wireless communications system that supports selecting an antenna array for beam management in accordance with one or more aspects of the present disclosure.

FIG. 5 illustrates an example of a wireless communications system 500 that supports selecting an antenna array for beam management in accordance with one or more aspects of the present disclosure. The wireless communications system 500 may implement or be implemented by aspects of the wireless communications system 100, the wireless communications system 200, and the process flow 400 with reference to FIGS. 1 through 4. For example, the wireless communications system 500 may include a network entity 105-e and a network entity 105-f, which may be examples of network entities 105 described herein with reference to FIGS. 1 through 4. Likewise, the wireless communications system 500 may include a UE 115-d and a UE 115-e, which may be examples of UEs 115 described herein with reference to FIGS. 1 through 4.

In some implementations of the wireless communications system 500, the UEs 115 may converge an uplink beam 510 on a first phasor 515 and a downlink beam 505 on a second phasor 515 into a single beam 520 for both uplink and downlink communications (e.g., full duplex communications) on a single phasor 515. For example, the UEs 115 may detect that the UEs 115 use different phasors 515 for the uplink beam 510 and the downlink beam 505. In such examples, the UEs 115 may determine to simultaneously activate both phasors 515 (e.g., leading to an increase in power consumption) based on one or more operating parameters. For example, the UEs 115 may determine to maintain the uplink beam 510 and the downlink beam 505 on separate phasors 515 or converge the beams based on whether the UEs 115 have surpassed one or more thermal thresholds (e.g., thermal mitigation procedure level 1 or level 3), a power consumption threshold, a battery life threshold (e.g., 15% or less battery life), or any combination thereof. That is, the UEs 115 may determine to converge the uplink beam 510 and the downlink beam 505 based on one or more operating parameters exceeding the threshold. In some cases, the threshold may be configured (e.g., in control signaling) by the network entities 105, or may be otherwise defined at the UEs 115.

In some examples, the UE 115-d may detect that a battery life threshold has been satisfied (e.g., the battery life is less than 15%), that a thermal mitigation procedure has begun, or a thermal threshold has been met at the UE 115-d. Thus, in order to mitigate further power consumption at the UE 115-d, the UE 115-d may converge the downlink beam 505 for a phasor 515-b with an uplink beam 510 for the phasor 515-a to form an uplink and downlink beam 520 on phasor 515-a. The UE 115-d may deactivate the phasor 515-b. Additionally, or alternatively, the UE 115-d may determine to converge the uplink beam 510 for the phasor 515-a with the downlink beam 505 for a phasor 515-b to form the uplink and downlink beam 520 on phasor 515-b and may deactivate the phasor 515-a. Thus, the UE 115-d may converge any one of the beams and deactivate the corresponding phasor 515.

In some implementations, the UEs 115 may determine which beam and phasor 515 to converge based on traffic parameters for signaling conveyed via the uplink beam 510 and the downlink beam 505 (e.g., a downlink heavy application or uplink heavy application). For example, the UEs 115 may monitor the traffic of both the uplink beam 510 and the downlink beam 505 and determine a priority for each beam. In such examples, the UEs 115 may determine to converge the beams to a single beam 520 on a single phasor 515 based on the priorities.

For example, the UE 115-d may detect that the battery life of the UE 115-d is below a battery life threshold, that a thermal threshold has been satisfied, or both and determine the priority of the uplink beam 510 and the downlink beam 505. In some cases, the UE 115-d may determine that the uplink beam 510 is the priority over the downlink beam 505 based on one or more traffic parameters, as described with reference to FIG. 4 (e.g., if the UE 115-d is uploading data to the network entity 105-c). Thus, the UE 115-d may converge the downlink beam 505 with the uplink beam 510, and may use the uplink and downlink beam 520-a to communicate with the network entity 105-e. In such cases, the UE 115-d may deactivate the phasor 515-b, thereby reducing power consumption (e.g., for power hungry scenarios) at the UE 115-d.

In some other examples, the UE 115-e may detect that the battery life of the UE 115-e is below a battery life threshold, that a thermal threshold has been satisfied, or both and determine the priority of the uplink beam 510 and the downlink beam 505. In some cases, the UE 115-e may determine that the downlink beam 505 is the priority over the uplink beam 510 based on one or more traffic parameters, as described with reference to FIG. 4 (e.g., if the UE 115-e is downloading data to the network entity 105-e). Thus, the UE 115-e may converge the uplink beam 510 with the downlink beam 505 and use the uplink and downlink beam 520-b to communicate with the network entity 105-f In such cases, the UE 115-d may use a single phasor 515, such as phasor 515-*c*, and may deactivate a phasor 515-*d*, thereby reducing power consumption (e.g., for power hungry scenarios) at the UE 115-*e*.

Figure 6:
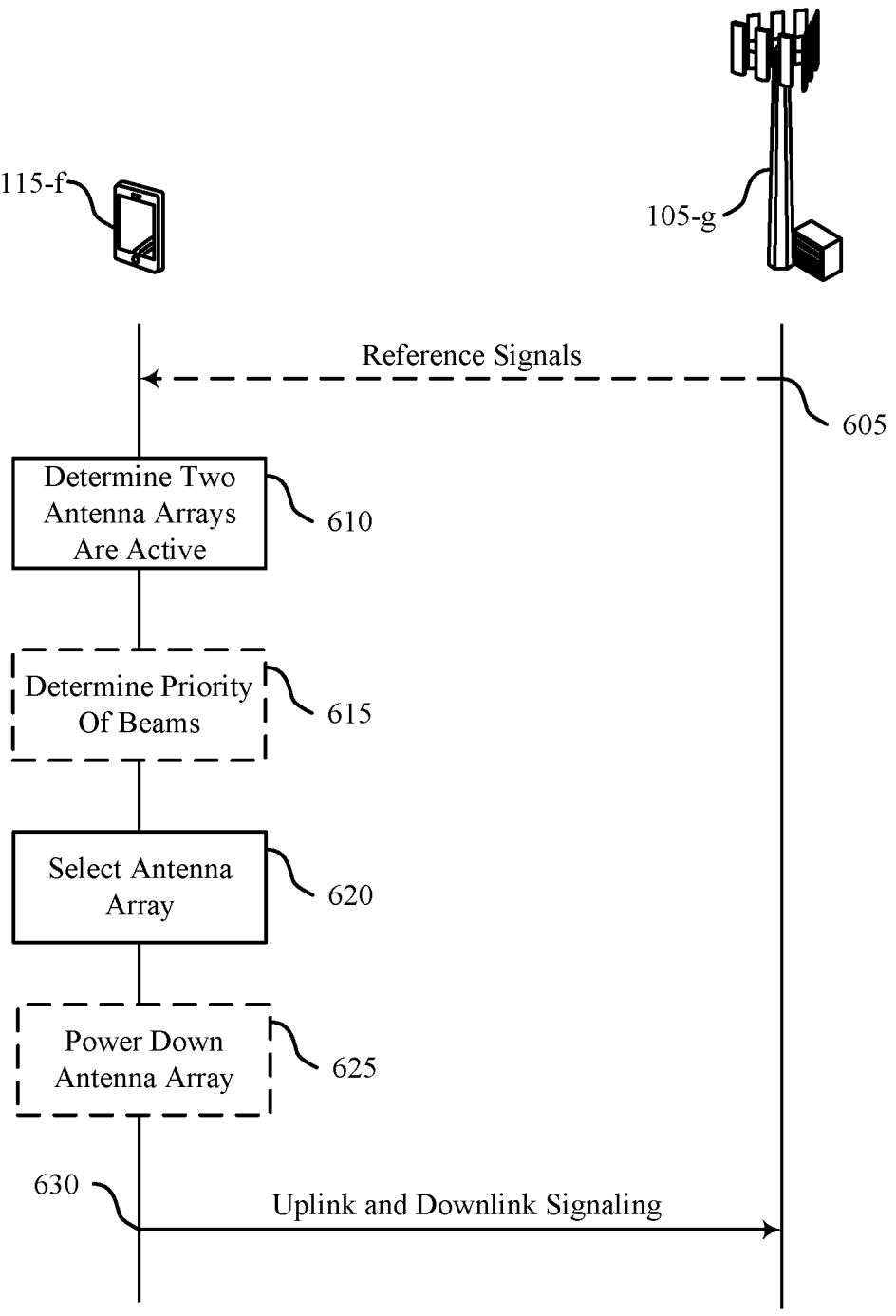
FIG. 6 illustrates an example of a process flow that supports selecting an antenna array for beam management in accordance with one or more aspects of the present disclosure.

FIG. 6 illustrates an example of a process flow 600 that supports selecting an antenna array for beam management in accordance with one or more aspects of the present disclosure. The process flow 600 may be implement, or be implemented, by aspects of the wireless communications system 100, the wireless communications system 200, the wireless communications system 300, the process flow 400, and the wireless communications system 500 with reference to FIGS. 1 through 5. For example, the process flow 600 may be implemented by a UE 115-*f*, which may be an example of a UE 115 as described with reference to FIGS. 1 through 5. Likewise, the process flow 600 may include a network entity 105-*g*, which may be an example of a network entity 105 as described with reference to FIGS. 1 through 5. In the following description of the process flow 600, the operations may be performed in a different order than the order shown. Specific operations also may be left out of the process flow 600, or other operations may be added to the process flow 600. Further, although some operations or signaling may be shown to occur at different times for discussion purposes, these operations may actually occur at the same time.

In some examples, a UE 115-*f* may have multiple antenna arrays, which may be referred to as phasors. The UE 115-*f* may generate or maintain one or more beams using the phasors. The beams may define a spatial relationship (e.g., direction) for signaling to and from the UE 115-*f*.

At 605, the network entity 105-*g* may transmit, and UE 115-*f* may receive, one or more reference signals. For example, the UE 115-*f* may receive one or more reference signals and perform measurements on the one or more reference signals based on an RSRP, a signal quality, an SNR, a spectral efficiency, or a combination thereof of the one or more reference signals. In some cases, the UE 115-*f* may select an uplink beam for uplink signaling and a downlink beam for downlink signaling based on the performed measurements. In such cases, the uplink signaling and downlink signaling may include one or more synchronization signals, which may be examples of SSBs.

At 610, the UE 115-*f* may determine that a first antenna array (e.g., a first phasor) and a second antenna array (e.g., a second phasor) at the UE 115-*f* are active and configured to operation in full duplex operation mode. For example, the UE 115-*f* may determine that the first antenna array supports (e.g., is configured to transmit signaling) uplink signaling via the uplink beam and the second antenna array supports (e.g., is configured to receive signaling) downlink signaling via the downlink beam. The first antenna array and the second antenna array may be examples of phasors, as described herein. In some cases, the first antenna array and the second antenna array may be associated with one or more operating parameters of the UE 115-*f*. The operating parameters may be a power level of the UE 115-*f*, a thermal level at the UE 115-*f*, a remaining battery life of the UE 115-*f*, or any combination thereof.

In some cases, due to the UE 115-*f* simultaneously activating the first antenna array and the second antenna array, the UE 115-*f* may determine that a value of the one or more operating parameters has satisfied a first threshold value. For example, the UE 115-*f* may determine that the power level of the UE 115-*f* has satisfied a threshold value. In such cases, it may be advantageous for the UE 115-*f* to maintain a single antenna array (e.g., to reduce power consumption, thermal properties, discharge rate, or the like at the UE 115-*f*).

At 615, the UE 115-*f* may optionally determine a priority of the uplink signaling and the downlink signaling based on comparing one or more traffic parameters of the uplink signaling to the downlink signaling. The traffic parameters may be examples of the traffic parameters as described with reference to FIG. 4. For example, based on the one or more traffic parameters, the UE 115-*f* may determine that the downlink signaling for the second antenna array is a priority over the uplink signaling for the first antenna array. In some other examples, the UE 115-*f* may determine that the uplink signaling for the first antenna array is a priority over the downlink signaling for the second antenna array. Additionally, or alternatively, the UE 115-*f* may not determine a priority of either the uplink signaling or downlink signaling, or determine that the priorities are equal.

At 620, the UE 115-*f* may select one antenna array of the first antenna array or the second antenna array to use for both the uplink signaling and the downlink signaling. For example, the UE 115-*f* may select the first antenna array or the second antenna array to maintain both the uplink beam and the downlink beam according to one or more stored indicators and processes, which may be examples of the measurements stored in the LUT and processes as described with reference to FIGS. 3 and 4. In some other examples, the UE 115-*f* may converge the downlink signaling and the uplink signaling onto a single beam for a single antenna array according to the techniques as described with reference to FIG. 5.

At 625, the UE 115-*f* may optionally power down the first or second antenna array based on converging the downlink signaling and uplink signaling on a single antenna array or selecting a single antenna array to maintain both the uplink signaling and the downlink signaling. For example, if the UE 115-*f* selects the first antenna array at 620, the UE 115-*f* may power down the second antenna array. Likewise, if the UE 115-*f* selects the second antenna array, the UE 115-*f* may power down the first antenna array, signaling and the downlink signaling using the selected antenna array. For example, the UE 115-*f* may use the selected antenna array to communicate both uplink and downlink signaling on a single beam. In some other examples, the UE 115-*f* may use the selected antenna array to communicate the uplink signaling and downlink signaling on the uplink beam and the downlink beam.

At 630, the UE 115-*f* may communicate, in the full duplex operation mode (e.g., concurrently), the uplink.

Figure 7:
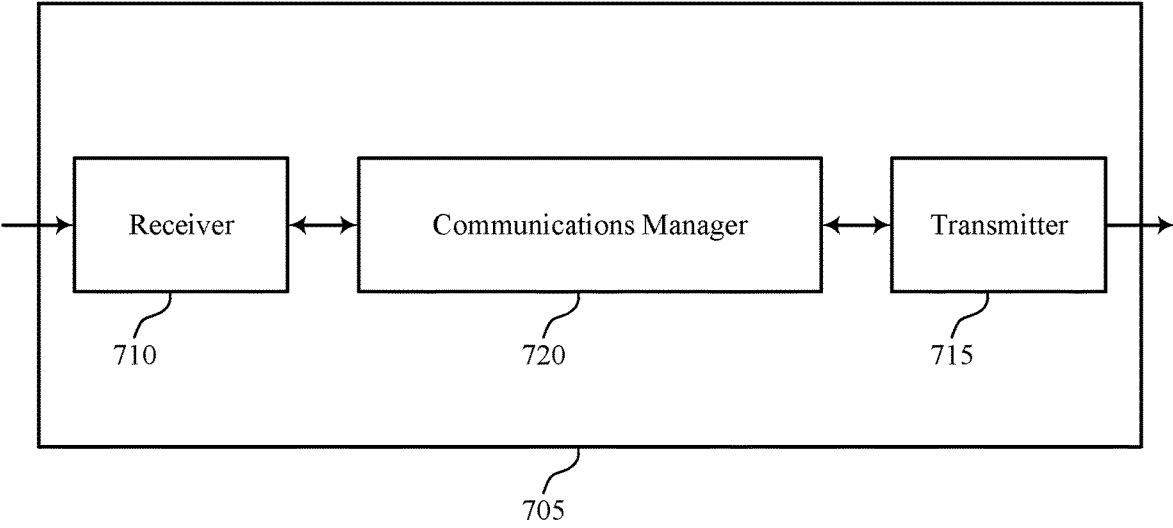
FIGS. 7 and 8 show block diagrams of devices that support selecting an antenna array for beam management in accordance with one or more aspects of the present disclosure.

FIG. 7 shows a block diagram 700 of a device 705 that supports selecting an antenna array for beam management in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to selecting an antenna array for beam management). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to selecting an antenna array for beam management). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of selecting an antenna array for beam management as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for determining a first antenna array and a second antenna array of a set of multiple antenna arrays at the UE are active for the UE operating in a full duplex operation mode, where uplink signaling at the UE corresponds to the first antenna array and downlink signaling at the UE corresponds to the second antenna array, the first antenna array and the second antenna array associated with one or more operating parameters of the UE. The communications manager 720 may be configured as or otherwise support a means for selecting one antenna array of the first antenna array or the second antenna array to use for both the uplink signaling and the downlink signaling based on a value of the one or more operating parameters of the UE satisfying a first threshold value. The communications manager 720 may be configured as or otherwise support a means for communicating, in the full duplex operation mode, the uplink signaling and the downlink signaling using the selected antenna array.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, and more efficient utilization of communication resources.

Figure 8:
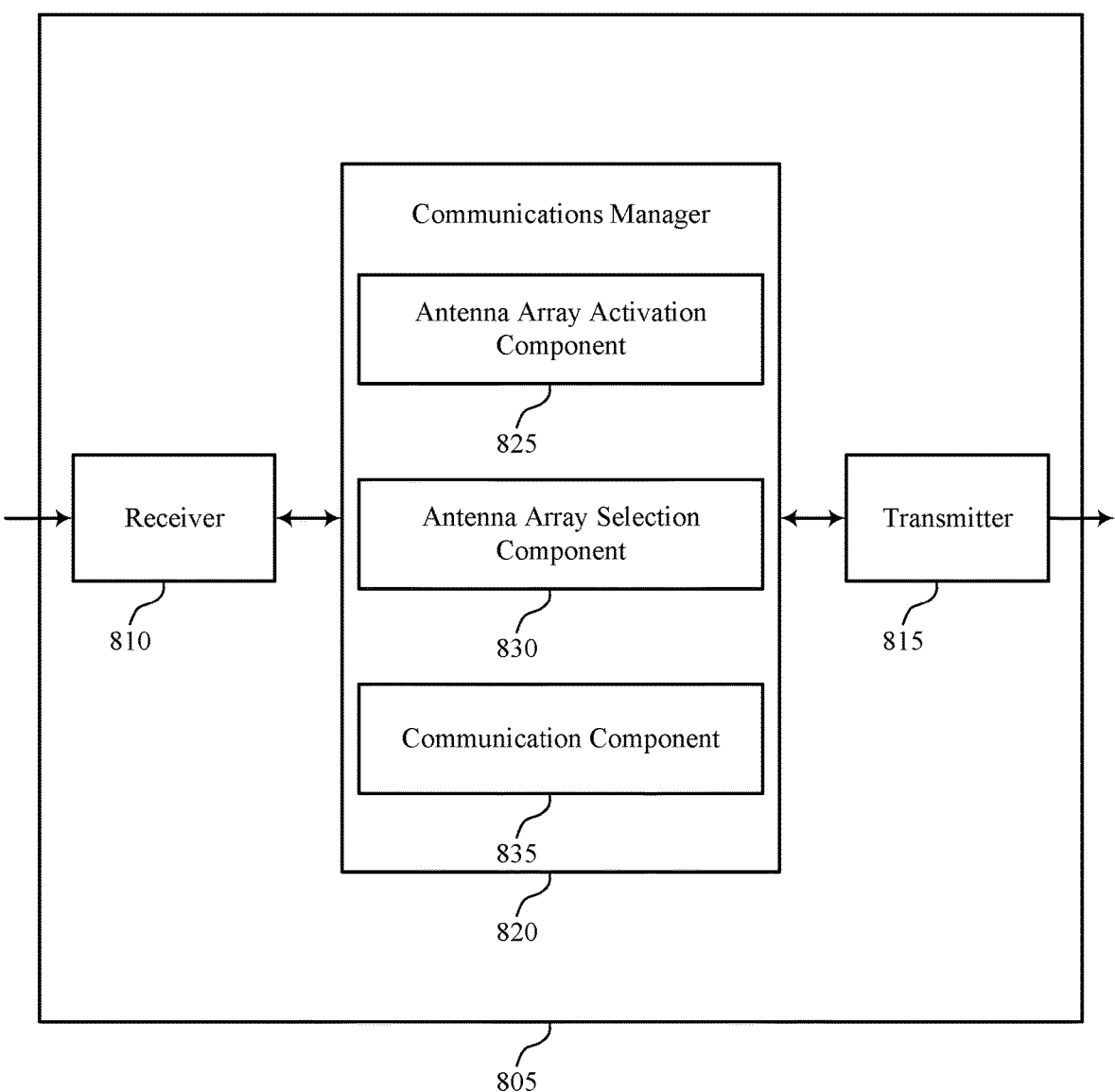

FIG. 8 shows a block diagram 800 of a device 805 that supports selecting an antenna array for beam management in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to selecting an antenna array for beam management). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to selecting an antenna array for beam management). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of selecting an antenna array for beam management as described herein. For example, the communications manager 820 may include an antenna array activation component 825, an antenna array selection component 830, a communication component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The antenna array activation component 825 may be configured as or otherwise support a means for determining a first antenna array and a second antenna array of a set of multiple antenna arrays at the UE are active for the UE operating in a full duplex operation mode, where uplink signaling at the UE corresponds to the first antenna array and downlink signaling at the UE corresponds to the second antenna array, the first antenna array and the second antenna array associated with one or more operating parameters of the UE. The antenna array selection component 830 may be configured as or otherwise support a means for selecting one antenna array of the first antenna array or the second antenna array to use for both the uplink signaling and the downlink signaling based on a value of the one or more operating parameters of the UE satisfying a first threshold value. The communication component 835 may be configured as or otherwise support a means for communicating, in the full duplex operation mode, the uplink signaling and the downlink signaling using the selected antenna array.

Figure 9:
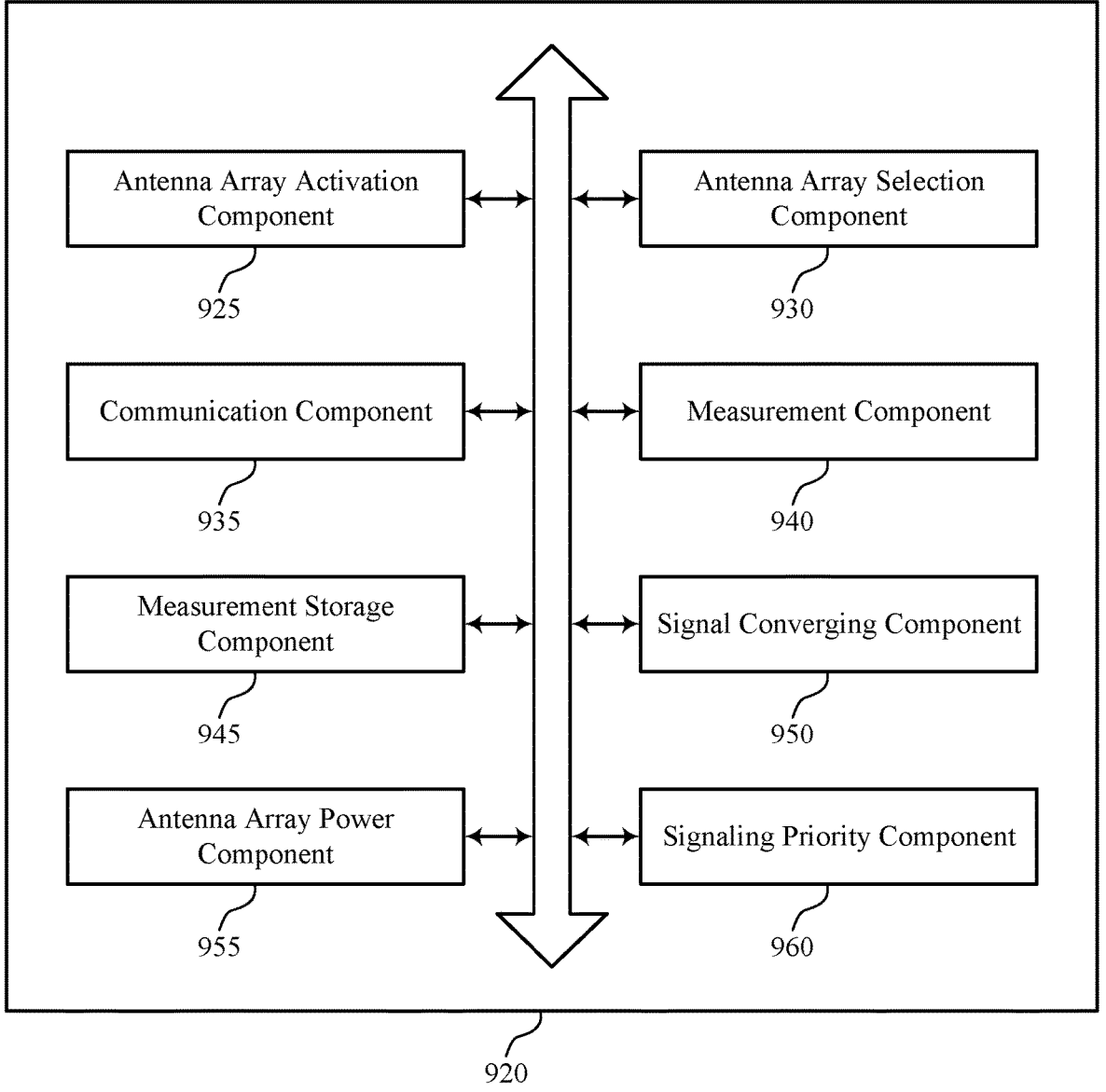
FIG. 9 shows a block diagram of a communications manager that supports selecting an antenna array for beam management in accordance with one or more aspects of the present disclosure.

FIG. 9 shows a block diagram 900 of a communications manager 920 that supports selecting an antenna array for beam management in accordance with one or more aspects of the present disclosure. The communications manager 920 may be an example of aspects of a communications manager 720, a communications manager 820, or both, as described herein. The communications manager 920, or various components thereof, may be an example of means for performing various aspects of selecting an antenna array for beam management as described herein. For example, the communications manager 920 may include an antenna array activation component 925, an antenna array selection component 930, a communication component 935, a measurement component 940, a measurement storage component 945, a signal converging component 950, an antenna array power component 955, a signaling priority component 960, or any combination thereof. Each of these components may communicate, directly or indirectly, with one another (e.g., via one or more buses).

The communications manager 920 may support wireless communication at a UE in accordance with examples as disclosed herein. The antenna array activation component 925 may be configured as or otherwise support a means for determining a first antenna array and a second antenna array of a set of multiple antenna arrays at the UE are active for the UE operating in a full duplex operation mode, where uplink signaling at the UE corresponds to the first antenna array and downlink signaling at the UE corresponds to the second antenna array, the first antenna array and the second antenna array associated with one or more operating parameters of the UE. The antenna array selection component 930 may be configured as or otherwise support a means for selecting one antenna array of the first antenna array or the second antenna array to use for both the uplink signaling and the downlink signaling based on a value of the one or more operating parameters of the UE satisfying a first threshold value. The communication component 935 may be configured as or otherwise support a means for communicating, in the full duplex operation mode, the uplink signaling and the downlink signaling using the selected antenna array.

In some examples, the measurement component 940 may be configured as or otherwise support a means for performing, according to a periodicity for one or more reference signals associated with the first antenna array and the second antenna array, a set of multiple measurements of the one or more reference signals corresponding to a first set of multiple beams associated with the first antenna array and a second set of multiple beams associated with the second antenna array. In some examples, the measurement storage component 945 may be configured as or otherwise support a means for determining, based on comparing the set of multiple measurements, to store a set of multiple indicators at the UE corresponding to a first uplink beam of the first set of multiple beams, a first downlink beam of the first set of multiple beams, a second uplink beam of the second set of multiple beams, a second downlink beam of the second set of multiple beams, or any combination thereof.

In some examples, to support selecting the one antenna array, the signaling priority component 960 may be configured as or otherwise support a means for determining a first priority of the downlink signaling corresponding to the second antenna array and a second priority of the uplink signaling corresponding to the first antenna array based on one or more traffic parameters of the uplink signaling and the downlink signaling, where the one antenna array is selected based on the first priority and the second priority, and the one or more traffic parameters include a number of MIMO layers, a rate of incoming downlink control information, an uplink throughput, a downlink throughput, a downlink modulation and coding scheme, a QAM, a rank indicator, a capacity of uplink buffers, a BSR, or any combination thereof.

In some examples, to support selecting the one antenna array, the signaling priority component 960 may be configured as or otherwise support a means for determining a first priority of the downlink signaling corresponding to the second antenna array is greater than a second priority of the uplink signaling corresponding to the first antenna array based on one or more traffic parameters of the uplink signaling and the downlink signaling. In some examples, to support selecting the one antenna array, the antenna array selection component 930 may be configured as or otherwise support a means for selecting the second antenna array as the one antenna array based on a difference between a first subset of measurements of the set of multiple measurements corresponding to the first uplink beam and a second subset of measurements of the set of multiple measurements corresponding to the second uplink beam satisfying a second threshold value, where the set of multiple indicators includes the set of multiple measurements. In some examples, to support selecting the one antenna array, the communication component 935 may be configured as or otherwise support a means for communicating the uplink signaling via the second uplink beam and the downlink signaling via the second downlink beam based on selecting the second antenna array.

In some examples, the one or more traffic parameters include a number of MIMO layers, a rate of incoming downlink control information, an uplink throughput, a downlink throughput, a downlink modulation and coding scheme, a QAM, a rank indicator, a capacity of uplink buffers, a BSR, or any combination thereof.

In some examples, to support selecting the one antenna array, the signaling priority component 960 may be configured as or otherwise support a means for determining a first priority of the downlink signaling corresponding to the second antenna array is less than a second priority of the uplink signaling corresponding to the first antenna array based on one or more traffic parameters of the uplink signaling and the downlink signaling. In some examples, to support selecting the one antenna array, the antenna array selection component 930 may be configured as or otherwise support a means for selecting the first antenna array based on a difference between a first subset of measurements of the set of multiple measurements corresponding to the first downlink beam and a second subset of measurements of the set of multiple measurements corresponding to the second downlink beam satisfying a second threshold value, where the set of multiple indicators includes the set of multiple measurements. In some examples, to support selecting the one antenna array, the communication component 935 may be configured as or otherwise support a means for communicating the uplink signaling via the first uplink beam and the downlink signaling via the first downlink beam based on selecting the first antenna array.

In some examples, performing the set of multiple measurements is based on a timer expiring.

In some examples, the set of multiple measurements include a reference signal receive power of the one or more reference signals, a signal quality of the one or more reference signals, a SNR of the one or more reference signals, a spectral efficiency of the one or more reference signals, or any combination thereof.

In some examples, the signal converging component 950 may be configured as or otherwise support a means for converging the uplink signaling or the downlink signaling to the one antenna array based on selecting the one antenna array. In some examples, the antenna array power component 955 may be configured as or otherwise support a means for powering down an unselected one of the first antenna array or the second antenna array based on the converged uplink signaling or the converged downlink signaling.

In some examples, the antenna array selection component 930 may be configured as or otherwise support a means for selecting the second antenna array based on determining a first priority of the downlink signaling corresponding to the second antenna array is greater than a second priority of the uplink signaling corresponding to the first antenna array based on one or more traffic parameters of the uplink signaling and the downlink signaling. In some examples, the signal converging component 950 may be configured as or otherwise support a means for converging the uplink signaling from the first antenna array to the second antenna array based on selecting the second antenna array. In some examples, the antenna array power component 955 may be configured as or otherwise support a means for powering down the first antenna array based on the converged uplink signaling.

In some examples, the antenna array selection component 930 may be configured as or otherwise support a means for selecting the first antenna array based on determining a first priority of the downlink signaling corresponding to the second antenna array is less than a second priority of the uplink signaling corresponding to the first antenna array based on one or more traffic parameters of the uplink signaling and the downlink signaling. In some examples, the signal converging component 950 may be configured as or otherwise support a means for converging the downlink signaling from the second antenna array to the first antenna array based on selecting the first antenna array. In some examples, the antenna array power component 955 may be configured as or otherwise support a means for powering down the second antenna array based on the converged downlink signaling.

In some examples, the one or more operating parameters include a power level at the UE, a thermal level at the UE, a remaining battery life of the UE, or any combination thereof.

In some examples, the uplink signaling and the downlink signaling include one or more synchronization signals.

Figure 10:
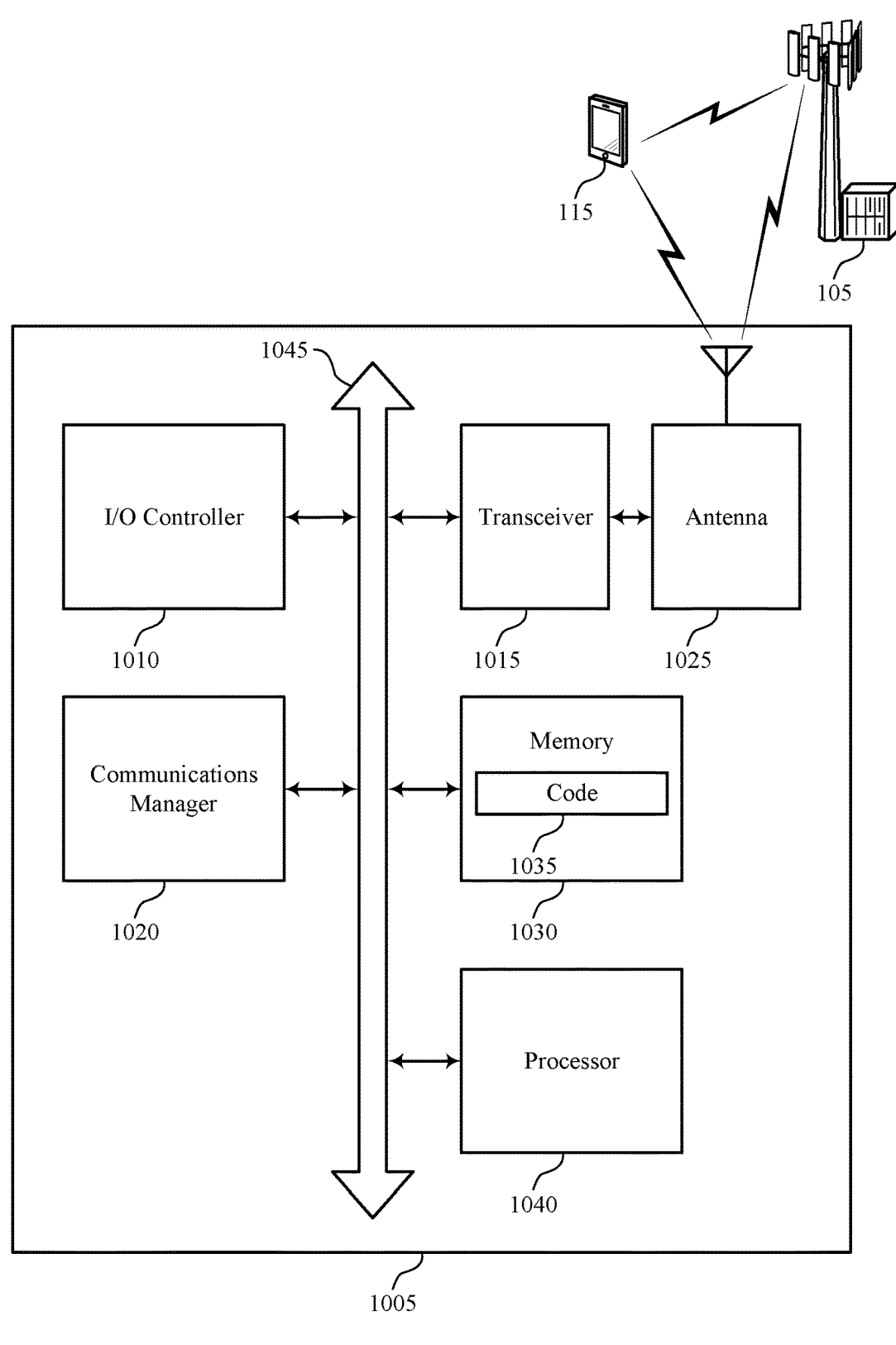
FIG. 10 shows a diagram of a system including a device that supports selecting an antenna array for beam management in accordance with one or more aspects of the present disclosure.

FIG. 10 shows a diagram of a system 1000 including a device 1005 that supports selecting an antenna array for beam management in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting selecting an antenna array for beam management). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for determining a first antenna array and a second antenna array of a set of multiple antenna arrays at the UE are active for the UE operating in a full duplex operation mode, where uplink signaling at the UE corresponds to the first antenna array and downlink signaling at the UE corresponds to the second antenna array, the first antenna array and the second antenna array associated with one or more operating parameters of the UE. The communications manager 1020 may be configured as or otherwise support a means for selecting one antenna array of the first antenna array or the second antenna array to use for both the uplink signaling and the downlink signaling based on a value of the one or more operating parameters of the UE satisfying a first threshold value. The communications manager 1020 may be configured as or otherwise support a means for communicating, in the full duplex operation mode, the uplink signaling and the downlink signaling using the selected antenna array.

By including or configuring the communications manager 1020 in accordance with examples as described herein, the device 1005 may support techniques for reduced power consumption, more efficient utilization of communication resources, and longer battery life.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of selecting an antenna array for beam management as described herein, or the processor 1040 and the memory 1030 may be otherwise configured to perform or support such operations.

FIG. 11 shows a flowchart illustrating a method 1100 that supports selecting an antenna array for beam management in accordance with one or more aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include determining a first antenna array and a second antenna array of a set of multiple antenna arrays at the UE are active for the UE operating in a full duplex operation mode, where uplink signaling at the UE corresponds to the first antenna array and downlink signaling at the UE corresponds to the second antenna array, the first antenna array and the second antenna array associated with one or more operating parameters of the UE. The operations of 1105 may be performed in accordance with examples as disclosed herein. In some examples, aspects of the operations of 1105 may be performed by an antenna array activation component 925 as described with reference to FIG. 9.

At 1110, the method may include selecting one antenna array of the first antenna array or the second antenna array to use for both the uplink signaling and the downlink signaling based on a value of the one or more operating parameters of the UE satisfying a first threshold value. The operations of 1110 may be performed in accordance with examples as disclosed herein. In some examples, aspects of the operations of 1110 may be performed by an antenna array selection component 930 as described with reference to FIG. 9.

At 1115, the method may include communicating, in the full duplex operation mode, the uplink signaling and the downlink signaling using the selected antenna array. The operations of 1115 may be performed in accordance with examples as disclosed herein. In some examples, aspects of the operations of 1115 may be performed by a communication component 935 as described with reference to FIG. 9.

FIG. 12 shows a flowchart illustrating a method 1200 that supports selecting an antenna array for beam management in accordance with one or more aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include determining a first antenna array and a second antenna array of a set of multiple antenna arrays at the UE are active for the UE operating in a full duplex operation mode, where uplink signaling at the UE corresponds to the first antenna array and downlink signaling at the UE corresponds to the second antenna array, the first antenna array and the second antenna array associated with one or more operating parameters of the UE. The operations of 1205 may be performed in accordance with examples as disclosed herein. In some examples, aspects of the operations of 1205 may be performed by an antenna array activation component 925 as described with reference to FIG. 9.

At 1210, the method may include selecting one antenna array of the first antenna array or the second antenna array to use for both the uplink signaling and the downlink signaling based on a value of the one or more operating parameters of the UE satisfying a first threshold value. The operations of 1210 may be performed in accordance with examples as disclosed herein. In some examples, aspects of the operations of 1210 may be performed by an antenna array selection component 930 as described with reference to FIG. 9.

At 1215, the method may include converging the uplink signaling or the downlink signaling to the one antenna array based on selecting the one antenna array. The operations of 1215 may be performed in accordance with examples as disclosed herein. In some examples, aspects of the operations of 1215 may be performed by a signal converging component 950 as described with reference to FIG. 9.

At 1220, the method may include powering down an unselected one of the first antenna array or the second antenna array based on the converged uplink signaling or the converged downlink signaling. The operations of 1220 may be performed in accordance with examples as disclosed herein. In some examples, aspects of the operations of 1220 may be performed by an antenna array power component 955 as described with reference to FIG. 9.

At 1225, the method may include communicating, in the full duplex operation mode, the uplink signaling and the downlink signaling using the selected antenna array. The operations of 1225 may be performed in accordance with examples as disclosed herein. In some examples, aspects of the operations of 1225 may be performed by a communication component 935 as described with reference to FIG. 9.

The following provides an overview of aspects of the present disclosure:

Aspect 1: A method for wireless communication at a UE, comprising: determining a first antenna array and a second antenna array of a plurality of antenna arrays at the UE are active for the UE operating in a full duplex operation mode, wherein uplink signaling at the UE corresponds to the first antenna array and downlink signaling at the UE corresponds to the second antenna array, the first antenna array and the second antenna array associated with one or more operating parameters of the UE; selecting one antenna array of the first antenna array or the second antenna array to use for both the uplink signaling and the downlink signaling based at least in part on a value of the one or more operating parameters of the UE satisfying a first threshold value; and communicating, in the full duplex operation mode, the uplink signaling and the downlink signaling using the selected antenna array.

Aspect 2: The method of aspect 1, further comprising: performing, according to a periodicity for one or more reference signals associated with the first antenna array and the second antenna array, a plurality of measurements of the one or more reference signals corresponding to a first plurality of beams associated with the first antenna array and a second plurality of beams associated with the second antenna array; determining, based at least in part on comparing the plurality of measurements, to store a plurality of indicators at the UE corresponding to a first uplink beam of the first plurality of beams, a first downlink beam of the first plurality of beams, a second uplink beam of the second plurality of beams, a second downlink beam of the second plurality of beams, or any combination thereof.

Aspect 3: The method of aspect 2, wherein selecting the one antenna array comprises: determining a first priority of the downlink signaling corresponding to the second antenna array and a second priority of the uplink signaling corresponding to the first antenna array based at least in part on one or more traffic parameters of the uplink signaling and the downlink signaling, wherein the one antenna array is selected based at least in part on the first priority and the second priority, and the one or more traffic parameters comprise a number of multiple-input-multiple-output layers, a rate of incoming downlink control information, an uplink throughput, a downlink throughput, a downlink modulation and coding scheme, a QAM, a rank indicator, a capacity of uplink buffers, a BSR, or any combination thereof Aspect 4: The method of aspects 2 and 3, wherein selecting the one antenna array comprises: determining a first priority of the downlink signaling corresponding to the second antenna array is greater than a second priority of the uplink signaling corresponding to the first antenna array based at least in part on one or more traffic parameters of the uplink signaling and the downlink signaling; selecting the second antenna array as the one antenna array based at least in part on a difference between a first subset of measurements of the plurality of measurements corresponding to the first uplink beam and a second subset of measurements of the plurality of measurements corresponding to the second uplink beam satisfying a second threshold value, wherein the plurality of indicators comprises the plurality of measurements; and communicating the uplink signaling via the second uplink beam and the downlink signaling via the second downlink beam based at least in part on selecting the second antenna array.

Aspect 5: The method of aspect 4, wherein the one or more traffic parameters comprise a number of multiple-input-multiple-output layers, a rate of incoming downlink control information, an uplink throughput, a downlink throughput, a downlink modulation and coding scheme, a QAM, a rank indicator, a capacity of uplink buffers, a BSR, or any combination thereof.

Aspect 6: The method of aspects 2 and 7, wherein selecting the one antenna array comprises: determining a first priority of the downlink signaling corresponding to the second antenna array is less than a second priority of the uplink signaling corresponding to the first antenna array based at least in part on one or more traffic parameters of the uplink signaling and the downlink signaling; selecting the first antenna array based at least in part on a difference between a first subset of measurements of the plurality of measurements corresponding to the first downlink beam and a second subset of measurements of the plurality of measurements corresponding to the second downlink beam satisfying a second threshold value, wherein the plurality of indicators comprises the plurality of measurements; and communicating the uplink signaling via the first uplink beam and the downlink signaling via the first downlink beam based at least in part on selecting the first antenna array.

Aspect 8: The method of any of aspects 2 through 6, wherein performing the plurality of measurements is based at least in part on a timer expiring.

Aspect 9: The method of any of aspects 2 through 8, wherein the plurality of measurements comprise a reference signal receive power of the one or more reference signals, a signal quality of the one or more reference signals, an SNR of the one or more reference signals, a spectral efficiency of the one or more reference signals, or any combination thereof.

Aspect 10: The method of aspect 1, further comprising: converging the uplink signaling or the downlink signaling to the one antenna array based at least in part on selecting the one antenna array; and powering down an unselected one of the first antenna array or the second antenna array based at least in part on the converged uplink signaling or the converged downlink signaling.

Aspect 11: The method of aspects 1 and 10, further comprising: selecting the second antenna array based at least in part on determining a first priority of the downlink signaling corresponding to the second antenna array is greater than a second priority of the uplink signaling corresponding to the first antenna array based at least in part on one or more traffic parameters of the uplink signaling and the downlink signaling; converging the uplink signaling from the first antenna array to the second antenna array based at least in part on selecting the second antenna array; and powering down the first antenna array based at least in part on the converged uplink signaling.

Aspect 12: The method of aspects 1 and 10, further comprising: selecting the first antenna array based at least in part on determining a first priority of the downlink signaling corresponding to the second antenna array is less than a second priority of the uplink signaling corresponding to the first antenna array based at least in part on one or more traffic parameters of the uplink signaling and the downlink signaling; converging the downlink signaling from the second antenna array to the first antenna array based at least in part on selecting the first antenna array; and powering down the second antenna array based at least in part on the converged downlink signaling.

Aspect 13: The method of any of aspects 1 through 12, wherein the one or more operating parameters comprise a power level at the UE, a thermal level at the UE, a remaining battery life of the UE, or any combination thereof.

Aspect 14: The method of any of aspects 1 through 13, wherein the uplink signaling and the downlink signaling comprise one or more synchronization signals.

Aspect 15: An apparatus for wireless communication at a UE, comprising a processor; memory coupled with the processor; and instructions stored in the memory and executable by the processor to cause the apparatus to perform a method of any of aspects 1 through 14.

Aspect 16: An apparatus for wireless communication at a UE, comprising at least one means for performing a method of any of aspects 1 through 14.

Aspect 17: A non-transitory computer-readable medium storing code for wireless communication at a UE, the code comprising instructions executable by a processor to perform a method of any of aspects 1 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

Also, as used herein, the phrase "a set" shall be construed as including the possibility of a set with one member. That is, the phrase "a set" shall be construed in the same manner as one or more.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors;
   one or more memories coupled with the one or more processors; and
   instructions stored in the one or more memories and executable by the one or more processors to cause the apparatus to:
      determine a first antenna array and a second antenna array of a plurality of antenna arrays at the UE are active for the UE operating in a full duplex operation mode, wherein uplink signaling at the UE corresponds to the first antenna array and downlink signaling at the UE corresponds to the second antenna array, the first antenna array and the second antenna array associated with a power level at the UE, a thermal level at the UE, a remaining battery life of the UE, or any combination thereof;
      store, to a look-up table at the UE, a plurality of indicators that correspond to a plurality of measurements of one or more reference signals, wherein the plurality of indicators correspond to a first uplink beam of a first plurality of beams, a first downlink beam of the first plurality of beams, a second uplink beam of a second plurality of beams, a second downlink beam of the second plurality of beams, or any combination thereof;
      select one antenna array of the first antenna array or the second antenna array to use for both the uplink signaling and the downlink signaling based at least in part on a value of the power level at the UE, the thermal level at the UE, the remaining battery life of the UE, or any combination thereof, satisfying a first threshold value and based at least in part on the plurality of indicators;
      power down an unselected one of the first antenna array or the second antenna array based at least in part on selecting the one antenna array of the first antenna array or the second antenna array; and
      communicate, in the full duplex operation mode, the uplink signaling and the downlink signaling using the selected antenna array.

2. The apparatus of claim 1, wherein the instructions are further executable by the one or more processors to cause the apparatus to:
   perform, according to a periodicity for the one or more reference signals associated with the first antenna array and the second antenna array, the plurality of measurements of the one or more reference signals corresponding to the first plurality of beams associated with the first antenna array and the second plurality of beams associated with the second antenna array.

3. The apparatus of claim 1, wherein the instructions to select the one antenna array are executable by the one or more processors to cause the apparatus to:
   determine a first priority of the downlink signaling corresponding to the second antenna array and a second priority of the uplink signaling corresponding to the first antenna array based at least in part on one or more traffic parameters of the uplink signaling and the downlink signaling, wherein the one antenna array is selected based at least in part on the first priority and the second priority, and the one or more traffic parameters comprise a number of multiple-input-multiple-output layers, a rate of incoming downlink control information, an uplink throughput, a downlink throughput, a downlink modulation and coding scheme, a quadrature amplitude modulation, a rank indicator, a capacity of uplink buffers, a buffer status report, or any combination thereof.

4. The apparatus of claim 1, wherein the instructions to select the one antenna array are executable by the one or more processors to cause the apparatus to:
   determine a first priority of the downlink signaling corresponding to the second antenna array is greater than a second priority of the uplink signaling corresponding to the first antenna array based at least in part on one or more traffic parameters of the uplink signaling and the downlink signaling;

select the second antenna array as the one antenna array based at least in part on a difference between a first subset of measurements of the plurality of measurements corresponding to the first uplink beam and a second subset of measurements of the plurality of measurements corresponding to the second uplink beam satisfying a second threshold value, wherein the plurality of indicators comprises the plurality of measurements; and communicate the uplink signaling via the second uplink beam and the downlink signaling via the second downlink beam based at least in part on selecting the second antenna array.

5. The apparatus of claim 4, wherein the one or more traffic parameters comprise a number of multiple-input-multiple-output layers, a rate of incoming downlink control information, an uplink throughput, a downlink throughput, a downlink modulation and coding scheme, a quadrature amplitude modulation, a rank indicator, a capacity of uplink buffers, a buffer status report, or any combination thereof.

6. The apparatus of claim 1, wherein the instructions to select the one antenna array are executable by the one or more processors to cause the apparatus to:

determine a first priority of the downlink signaling corresponding to the second antenna array is less than a second priority of the uplink signaling corresponding to the first antenna array based at least in part on one or more traffic parameters of the uplink signaling and the downlink signaling;

select the first antenna array based at least in part on a difference between a first subset of measurements of the plurality of measurements corresponding to the first downlink beam and a second subset of measurements of the plurality of measurements corresponding to the second downlink beam satisfying a second threshold value, wherein the plurality of indicators comprises the plurality of measurements; and communicate the uplink signaling via the first uplink beam and the downlink signaling via the first downlink beam based at least in part on selecting the first antenna array.

7. The apparatus of claim 2, wherein performing the plurality of measurements is based at least in part on a timer expiring.

8. The apparatus of claim 1, wherein the plurality of measurements comprise a reference signal receive power of the one or more reference signals, a signal quality of the one or more reference signals, a signal-to-noise ratio of the one or more reference signals, a spectral efficiency of the one or more reference signals, or any combination thereof.

9. The apparatus of claim 1, wherein the instructions are further executable by the one or more processors to cause the apparatus to:

converge the uplink signaling or the downlink signaling to the one antenna array based at least in part on selecting the one antenna array, wherein powering down the unselected one of the first antenna array or the second antenna array is based at least in part on the converged uplink signaling or the converged downlink signaling.

10. The apparatus of claim 1, wherein the instructions are further executable by the one or more processors to cause the apparatus to:

select the second antenna array based at least in part on determining a first priority of the downlink signaling corresponding to the second antenna array is greater than a second priority of the uplink signaling corresponding to the first antenna array based at least in part on one or more traffic parameters of the uplink signaling and the downlink signaling;

converge the uplink signaling from the first antenna array to the second antenna array based at least in part on selecting the second antenna array; and power down the first antenna array based at least in part on the converged uplink signaling.

11. The apparatus of claim 1, wherein the instructions are further executable by the one or more processors to cause the apparatus to:

select the first antenna array based at least in part on determining a first priority of the downlink signaling corresponding to the second antenna array is less than a second priority of the uplink signaling corresponding to the first antenna array based at least in part on one or more traffic parameters of the uplink signaling and the downlink signaling;

converge the downlink signaling from the second antenna array to the first antenna array based at least in part on selecting the first antenna array; and power down the second antenna array based at least in part on the converged downlink signaling.

12. The apparatus of claim 1, wherein the uplink signaling and the downlink signaling comprise one or more synchronization signals.

13. A method for wireless communication at a user equipment (UE), comprising:

determining a first antenna array and a second antenna array of a plurality of antenna arrays at the UE are active for the UE operating in a full duplex operation mode, wherein uplink signaling at the UE corresponds to the first antenna array and downlink signaling at the UE corresponds to the second antenna array, the first antenna array and the second antenna array associated with a power level at the UE, a thermal level at the UE, a remaining battery life of the UE, or any combination thereof;

storing, to a look-up table at the UE, a plurality of indicators that correspond to a plurality of measurements of one or more reference signals, wherein the plurality of indicators correspond to a first uplink beam of a first plurality of beams, a first downlink beam of the first plurality of beams, a second uplink beam of a second plurality of beams, a second downlink beam of the second plurality of beams, or any combination thereof;

selecting one antenna array of the first antenna array or the second antenna array to use for both the uplink signaling and the downlink signaling based at least in part on a value of the power level at the UE, the thermal level at the UE, the remaining battery life of the UE, or any combination thereof, satisfying a first threshold value and based at least in part on the plurality of indicators, powering down an unselected one of the first antenna array or the second antenna array based at least in part on selecting the one antenna array of the first antenna array or the second antenna array; and communicating, in the full duplex operation mode, the uplink signaling and the downlink signaling using the selected antenna array.

14. The method of claim 13, further comprising:

performing, according to a periodicity for the one or more reference signals associated with the first antenna array and the second antenna array, the plurality of measurements of the one or more reference signals corresponding to the first plurality of beams associated with the first antenna array and the second plurality of beams associated with the second antenna array.

15. The method of claim 14, wherein selecting the one antenna array comprises:

determining a first priority of the downlink signaling corresponding to the second antenna array and a second priority of the uplink signaling corresponding to the first antenna array based at least in part on one or more traffic parameters of the uplink signaling and the downlink signaling, wherein the one antenna array is selected based at least in part on the first priority and the second priority, and the one or more traffic parameters comprise a number of multiple-input-multiple-output layers, a rate of incoming downlink control information, an uplink throughput, a downlink throughput, a downlink modulation and coding scheme, a quadrature amplitude modulation, a rank indicator, a capacity of uplink buffers, a buffer status report, or any combination thereof.

16. The method of claim 13, wherein selecting the one antenna array comprises:

determining a first priority of the downlink signaling corresponding to the second antenna array is greater than a second priority of the uplink signaling corresponding to the first antenna array based at least in part on one or more traffic parameters of the uplink signaling and the downlink signaling;

selecting the second antenna array as the one antenna array based at least in part on a difference between a first subset of measurements of the plurality of measurements corresponding to the first uplink beam and a second subset of measurements of the plurality of measurements corresponding to the second uplink beam satisfying a second threshold value, wherein the plurality of indicators comprises the plurality of measurements; and communicating the uplink signaling via the second uplink beam and the downlink signaling via the second downlink beam based at least in part on selecting the second antenna array.

17. The method of claim 16, wherein the one or more traffic parameters comprise a number of multiple-input-multiple-output layers, a rate of incoming downlink control information, an uplink throughput, a downlink throughput, a downlink modulation and coding scheme, a quadrature amplitude modulation, a rank indicator, a capacity of uplink buffers, a buffer status report, or any combination thereof.

18. The method of claim 13, wherein selecting the one antenna array comprises:

determining a first priority of the downlink signaling corresponding to the second antenna array is less than a second priority of the uplink signaling corresponding to the first antenna array based at least in part on one or more traffic parameters of the uplink signaling and the downlink signaling;

selecting the first antenna array based at least in part on a difference between a first subset of measurements of the plurality of measurements corresponding to the first downlink beam and a second subset of measurements of the plurality of measurements corresponding to the second downlink beam satisfying a second threshold value, wherein the plurality of indicators comprises the plurality of measurements; and communicating the uplink signaling via the first uplink beam and the downlink signaling via the first downlink beam based at least in part on selecting the first antenna array.

19. The method of claim 14, wherein performing the plurality of measurements is based at least in part on a timer expiring.

20. The method of claim 13, wherein the plurality of measurements comprise a reference signal receive power of the one or more reference signals, a signal quality of the one or more reference signals, a signal-to-noise ratio of the one or more reference signals, a spectral efficiency of the one or more reference signals, or any combination thereof.

21. The method of claim 13, further comprising:

converging the uplink signaling or the downlink signaling to the one antenna array based at least in part on selecting the one antenna array, wherein powering down the unselected one of the first antenna array or the second antenna array based at least in part on the converged uplink signaling or the converged downlink signaling.

22. The method of claim 13, further comprising:

selecting the second antenna array based at least in part on determining a first priority of the downlink signaling corresponding to the second antenna array is greater than a second priority of the uplink signaling corresponding to the first antenna array based at least in part on one or more traffic parameters of the uplink signaling and the downlink signaling;

converging the uplink signaling from the first antenna array to the second antenna array based at least in part on selecting the second antenna array; and powering down the first antenna array based at least in part on the converged uplink signaling.

23. The method of claim 13, further comprising:

selecting the first antenna array based at least in part on determining a first priority of the downlink signaling corresponding to the second antenna array is less than a second priority of the uplink signaling corresponding to the first antenna array based at least in part on one or more traffic parameters of the uplink signaling and the downlink signaling;

converging the downlink signaling from the second antenna array to the first antenna array based at least in part on selecting the first antenna array; and powering down the second antenna array based at least in part on the converged downlink signaling.

24. The method of claim 13, wherein the uplink signaling and the downlink signaling comprise one or more synchronization signals.

25. An apparatus for wireless communication at a user equipment (UE), comprising:

means for determining a first antenna array and a second antenna array of a plurality of antenna arrays at the UE are active for the UE operating in a full duplex operation mode, wherein uplink signaling at the UE corresponds to the first antenna array and downlink signaling at the UE corresponds to the second antenna array, the first antenna array and the second antenna array associated with a power level at the UE, a thermal level at the UE, a remaining battery life of the UE, or any combination thereof;

means for storing, to a look-up table at the UE, a plurality of indicators that correspond to a plurality of measurements of one or more reference signals, wherein the plurality of indicators correspond to a first uplink beam of a first plurality of beams, a first downlink beam of the first plurality of beams, a second uplink beam of a second plurality of beams, a second downlink beam of the second plurality of beams, or any combination thereof;

means for selecting one antenna array of the first antenna array or the second antenna array to use for both the uplink signaling and the downlink signaling based at least in part on a value of the power level at the UE, the thermal level at the UE, the remaining battery life of the UE, or any combination thereof, satisfying a first threshold value and based at least in part on the plurality of indicators;

means for powering down an unselected one of the first antenna array or the second antenna array based at least in part on selecting the one antenna array of the first antenna array or the second antenna array; and means for communicating, in the full duplex operation mode, the uplink signaling and the downlink signaling using the selected antenna array.

26. The apparatus of claim 25, further comprising:

means for converging the uplink signaling or the downlink signaling to the one antenna array based at least in part on selecting the one antenna array, wherein powering down the unselected one of the first antenna array or the second antenna array based at least in part on the converged uplink signaling or the converged downlink signaling.

27. A non-transitory computer-readable medium storing code for wireless communication at a user equipment (UE), the code comprising instructions executable by one or more processors to:

determine a first antenna array and a second antenna array of a plurality of antenna arrays at the UE are active for the UE operating in a full duplex operation mode, wherein uplink signaling at the UE corresponds to the first antenna array and downlink signaling at the UE corresponds to the second antenna array, the first antenna array and the second antenna array associated with a power level at the UE, a thermal level at the UE, a remaining battery life of the UE, or any combination thereof;

store, to a look-up table at the UE, a plurality of indicators that correspond to a plurality of measurements of one or more reference signals, wherein the plurality of indicators correspond to a first uplink beam of a first plurality of beams, a first downlink beam of the first plurality of beams, a second uplink beam of a second plurality of beams, a second downlink beam of the second plurality of beams, or any combination thereof;

select one antenna array of the first antenna array or the second antenna array to use for both the uplink signaling and the downlink signaling based at least in part on a value of the power level at the UE, the thermal level at the UE, the remaining battery life of the UE, or any combination thereof, satisfying a first threshold value and based at least in part on the plurality of indicators;

power down an unselected one of the first antenna array or the second antenna array based at least in part on selecting the one antenna array of the first antenna array or the second antenna array; and communicate, in the full duplex operation mode, the uplink signaling and the downlink signaling using the selected antenna array.

28. The non-transitory computer-readable medium of claim 27, wherein the instructions are further executable by the one or more processors to:

converge the uplink signaling or the downlink signaling to the one antenna array based at least in part on selecting the one antenna array, wherein powering down the unselected one of the first antenna array or the second antenna array based at least in part on the converged uplink signaling or the converged downlink signaling.

* * * * *